(12) United States Patent
Shan et al.

(10) Patent No.: US 12,435,218 B2
(45) Date of Patent: Oct. 7, 2025

(54) POLYCARBONATE COMPOSITIONS HAVING IMPROVED CHEMICAL RESISTANCE, ARTICLES FORMED THEREOF, AND METHODS OF MANUFACTURE

(71) Applicant: SHPP Global Technologies B.V., Bergen Op Zoom (NL)

(72) Inventors: Wei Shan, Shanghai (CN); Siguang Jiang, Shanghai (CN); Ying Na, Shanghai (CN); Rahul Patil, Evansville, IN (US); Peter Vollenberg, Evansville, IN (US)

(73) Assignee: SHPP GLOBAL TECHNOLOGIES B.V., Bergen Op Zoom (NL)

( * ) Notice: Subject to any disclaimer, the term of this patent is extended or adjusted under 35 U.S.C. 154(b) by 75 days.

(21) Appl. No.: 16/769,824

(22) PCT Filed: Aug. 10, 2018

(86) PCT No.: PCT/IB2018/056044
§ 371 (c)(1),
(2) Date: Jun. 4, 2020

(87) PCT Pub. No.: WO2019/123029
PCT Pub. Date: Jun. 27, 2019

(65) Prior Publication Data
US 2020/0369875 A1 Nov. 26, 2020

Related U.S. Application Data

(60) Provisional application No. 62/599,891, filed on Dec. 18, 2017, provisional application No. 62/599,885, filed on Dec. 18, 2017.

(51) Int. Cl.
*C08L 69/00* (2006.01)
*C08G 64/18* (2006.01)
*C08G 77/448* (2006.01)
*C08K 3/22* (2006.01)

(52) U.S. Cl.
CPC ............ *C08L 69/00* (2013.01); *C08G 64/186* (2013.01); *C08G 77/448* (2013.01); *C08K 2003/2241* (2013.01); *C08L 2203/20* (2013.01); *C08L 2205/025* (2013.01); *C08L 2205/035* (2013.01); *C08L 2207/53* (2013.01)

(58) Field of Classification Search
None
See application file for complete search history.

(56) References Cited

U.S. PATENT DOCUMENTS

| | | |
|---|---|---|
| 3,929,908 A | 12/1975 | Orlando et al. |
| 4,170,711 A | 10/1979 | Orlando et al. |
| 4,923,933 A | 5/1990 | Curry |
| 5,380,795 A * | 1/1995 | Gosens ............... C08L 69/00 525/464 |
| 7,232,865 B2 | 6/2007 | Derudder et al. |
| 7,615,594 B2 | 11/2009 | Hashimoto et al. |
| 8,466,249 B2 | 6/2013 | Gallucci et al. |
| 9,018,286 B2 | 4/2015 | Daga et al. |
| 9,023,923 B2 | 5/2015 | An et al. |
| 9,187,639 B2 | 11/2015 | Zheng et al. |
| 9,499,695 B2 | 11/2016 | Tomita et al. |
| 9,598,577 B1 | 3/2017 | Groote et al. |
| 9,598,578 B1 | 3/2017 | Groote et al. |
| 9,790,363 B2 | 10/2017 | Chen et al. |
| 10,501,624 B2 | 12/2019 | Jung et al. |
| 10,655,001 B2 | 5/2020 | Hein et al. |
| 11,104,796 B2 | 8/2021 | Chen et al. |
| 11,718,749 B2 | 8/2023 | Huang et al. |
| 2002/0026008 A1 * | 2/2002 | Okamoto ............... C08L 69/00 525/67 |
| 2005/0187372 A1 | 8/2005 | Venderbosch et al. |
| 2006/0074156 A1 | 4/2006 | Ebeling et al. |
| 2007/0129492 A1 | 6/2007 | Colborn et al. |
| 2008/0015289 A1 | 1/2008 | Siripurapu |

(Continued)

FOREIGN PATENT DOCUMENTS

| | | |
|---|---|---|
| CN | 105315644 A | 2/2016 |
| EP | 3572453 A1 | 11/2019 |

(Continued)

OTHER PUBLICATIONS

Park; Extensional and Complex Viscosities of Linear and Branched Polycarbonate Blends; Macromolecular Research vol. 10 No. 3 (2002) pp. 135-139. (Year: 2002).*
Google patents translation of KR101741174 (2023). (Year: 2023).*
Japaneese application number 2017-038842 filed Mar. 1, 2017 (no published date). (Year: 0000).*
LeGrand, Handbook of Polycarbonate Science and Technology (2000) pp. 180-182. (Year: 2000).*
International Search Report of the International Search Authority for International Applicaton No. PCT/IB2018/056044; International Filing Date: Aug. 10, 2018; Date of Mailing: Jun. 11, 2018; 3 pages.
Written Opinion of the International Search Authority for International Applicaton No. PCT/IB2018/056044; International Filing Date: Aug. 10, 2018; Date of Mailing: Jun. 11, 2018; 3 pages.
Silicone-based Flame Retardant for Polycarbonate, Antec, 2009, pp. 1351-1354.
Van de Grampel et al., "New Polycarbonate-Polysiloxane Copolymer Blend Resins for Consumer Electronic Applications", Antec, 2014, pp. 2375-2378.

(Continued)

*Primary Examiner* — David J Buttner
(74) *Attorney, Agent, or Firm* — CANTOR COLBURN LLP

(57) ABSTRACT

A polycarbonate composition includes: 10 to 99 wt % of one or more bisphenol A polycarbonate homopolymers based on the total weight of the polycarbonate composition; a poly (carbonate-siloxane) having a siloxane content of 30 to 70 wt %, preferably 35 to 65 wt %, based on the total weight of the poly(carbonate-siloxane), optionally wherein the poly (carbonate-siloxane) is a poly(carbonate-siloxane) elastomer, in an amount effective to provide a total siloxane content of 0.5 to 10 wt % based on the total weight of the polycarbonate composition; and wherein a sample of the composition has improved chemical resistance as compared to a reference composition.

16 Claims, No Drawings

(56) References Cited

U.S. PATENT DOCUMENTS

| | | | |
|---|---|---|---|
| 2012/0288654 A1* | 11/2012 | Gallucci | C08G 77/448 524/588 |
| 2013/0313493 A1 | 11/2013 | Wen et al. | |
| 2013/0317142 A1 | 11/2013 | Chen et al. | |
| 2013/0317148 A1 | 11/2013 | Zheng et al. | |
| 2014/0058023 A1 | 2/2014 | Want et al. | |
| 2014/0107264 A1 | 4/2014 | Van Der Weele et al. | |
| 2014/0179821 A1 | 6/2014 | Morizur et al. | |
| 2014/0179843 A1 | 6/2014 | Van Der Mee et al. | |
| 2014/0326162 A1 | 11/2014 | Van Der Mee et al. | |
| 2014/0357769 A1 | 12/2014 | Zheng et al. | |
| 2017/0129997 A1 | 5/2017 | Lyakhovych et al. | |
| 2017/0137621 A1* | 5/2017 | Groote | C08G 64/186 |
| 2017/0247539 A1 | 8/2017 | Chen et al. | |
| 2018/0066134 A1* | 3/2018 | Aoki | C08K 9/04 |
| 2018/0237609 A1* | 8/2018 | Ishikawa | C08K 3/30 |
| 2018/0251636 A1* | 9/2018 | Abe | C08G 64/24 |
| 2020/0010683 A1* | 1/2020 | Ishikawa | C08L 83/10 |
| 2021/0198481 A1 | 7/2021 | Huang et al. | |
| 2021/0284837 A1* | 9/2021 | Ishikawa | C08G 77/20 |
| 2024/0002657 A1 | 1/2024 | Sangregorio et al. | |
| 2024/0010833 A1 | 1/2024 | Sangregorio et al. | |
| 2024/0018353 A1 | 1/2024 | Sangregorio et al. | |
| 2024/0117181 A1 | 4/2024 | Sangregorio et al. | |

FOREIGN PATENT DOCUMENTS

| | | | |
|---|---|---|---|
| JP | 07216080 | * | 8/1995 |
| JP | 2015137308 A | | 7/2015 |
| KR | 20070018801 A | | 2/2007 |
| KR | 101741174 B1 | | 12/2015 |
| KR | 101741174 | * | 5/2017 |
| KR | 20190019634 A | | 2/2019 |
| WO | 2013066000 A1 | | 5/2013 |
| WO | 2013175448 A1 | | 11/2013 |
| WO | 2014072923 A1 | | 5/2014 |
| WO | 2015065611 A1 | | 5/2015 |
| WO | 2016063154 A1 | | 4/2016 |
| WO | 2016174592 A1 | | 11/2016 |
| WO | 2019123029 A1 | | 6/2019 |
| WO | 2020079565 A1 | | 4/2020 |
| WO | 2020178709 A1 | | 9/2020 |
| WO | 2022106912 A1 | | 5/2022 |
| WO | 2022107028 A1 | | 5/2022 |
| WO | 2022107029 A1 | | 5/2022 |
| WO | 2022107030 A1 | | 5/2022 |

OTHER PUBLICATIONS

UL 94, "Tests for Flammability of Plastic Materials for Parts in Devices and Appliances", Underwriters Laboratories, Inc. (UL), Dec. 12, 2003, 52 pages.

Mori, S., Barth, H.G. (1999). Transformation of the Universal Calibration Curve. (Chapter 7) Approaches to Molecular Weight Calibration. In: Size Exclusion Chromatography. Springer Laboratory. Springer, Berlin, Heidelberg. p. 110.

Mori, S., Barth, H.G. (1999). Appendix I—Mark-Houwink Parameters for Homopolymers. In: Size Exclusion Chromatography. Springer Laboratory. Springer, Berlin, Heidelberg. p. 199.

Mori, S., Barth, H.G. (1999). Appendix I . In: Size Exclusion Chromatography. Springer Laboratory. Springer, Berlin, Heidelberg, p. 200.

* cited by examiner

POLYCARBONATE COMPOSITIONS HAVING IMPROVED CHEMICAL RESISTANCE, ARTICLES FORMED THEREOF, AND METHODS OF MANUFACTURE

CROSS REFERENCE TO RELATED APPLICATIONS

This application is a National Stage application of PCT/IB2018/056044, filed Aug. 10, 2018, which claims the benefit of U.S. Provisional Application No. 62/599,891, filed Dec. 18, 2017 and U.S. Provisional Application No. 62/599,885, filed Dec. 18, 2017, all of which are incorporated by reference in their entirety herein.

BACKGROUND

This disclosure relates to polycarbonate compositions, and in particular to polycarbonate compositions having improved chemical resistance, methods of manufacture, and uses thereof.

Polycarbonates are useful in the manufacture of articles and components for a wide range of applications, from automotive parts to electronic appliances at least in part because of their good balance of properties, such as moldability, heat resistance and impact properties, among others. Because of their beneficial properties such as transparency and impact resistance, polycarbonates have also been used in healthcare applications such as transfusion joints and monitor housing. Since many of the healthcare products are often exposed to various chemicals including sanitizers and drugs, it is desirable for these products to have good chemical resistance. Thus there is a need in the art for optimized polycarbonate compositions with properties such as good chemical resistance. It would be a further advantage if such products have good aesthetics and good flame retardant properties. There is also a need in the art for optimized polycarbonate compositions for consumer electronics such as mobile phone adapter housing and USB connector applications with properties such as good chemical resistance, low temperature impact, and good flame retardant properties.

SUMMARY

In an embodiment, a polycarbonate composition includes: 10 to 99 wt % of one or more bisphenol A polycarbonate homopolymers based on the total weight of the polycarbonate composition; a poly(carbonate-siloxane) having a siloxane content of 30 to 70 wt %, based on the total weight of the poly(carbonate-siloxane), optionally wherein the poly(carbonate-siloxane) is a poly(carbonate-siloxane) elastomer, in an amount effective to provide a total siloxane content of 0.5 to 10 wt % based on the total weight of the polycarbonate composition; and wherein a sample of the composition has improved chemical resistance as compared to a reference composition.

In another embodiment, a molded article, a thermoformed article, an extruded film, an extruded sheet, a honeycomb structure, one or more layers of a multi-layer article, a substrate for a coated article, and a substrate for a metallized article comprises the above-described polycarbonate composition.

In yet another embodiment, a method of manufacture of an article comprises molding, extruding, casting, or shaping the above-described polycarbonate composition into an article.

The above described and other features are exemplified by the following Detailed Description and Examples.

DETAILED DESCRIPTION

Provided herein are polycarbonate compositions having improved chemical resistance. In some embodiments, the improved chemical resistance can unexpectedly be obtained by adding a small amount of certain impact modifiers to a blend of one or more polycarbonate homopolymer, and a poly(carbonate-siloxane) having a siloxane content of 30 to 70 wt %, or 35 to 65 wt %, based on the total weight of the poly(carbonate-siloxane). The impact modifiers include a silicone-based impact modifier different from the poly(carbonate-siloxane), a methyl methacrylate-butadiene-styrene copolymer, or a combination thereof. Advantageously, these compositions also have one or more of good aesthetics, good flame retardant properties, and good mechanical properties. The polycarbonate compositions according to the disclosure can advantageously be used in healthcare and consumer electronic applications.

In another embodiment, the improved chemical resistance can unexpectedly be obtained by combining a polycarbonate, preferably a bisphenol A polycarbonate homopolymer, with a poly(carbonate-siloxane) having a siloxane content of 30 to 70 wt %, or 35 to 65 wt %, or 35 to 60 wt %, based on the total weight of the poly(carbonate-siloxane). In particular, at the same total siloxane loading level, compositions containing the same polycarbonate but only a poly(carbonate-siloxane) having a siloxane content of 20 wt % based on the total weight of the poly(carbonate-siloxane) can have less chemical resistance. These compositions can have balanced properties, including two or more of chemical resistance, flame retardance, impact, and flow properties. Without wishing to be bound by theory, it is believed that the unexpected combination of chemical resistance, flame retardance, impact, and flow properties is achieved by careful selection and balancing of the poly(carbonate-siloxane) used in the composition including the selection of weight percent (wt %) of the siloxane units in the poly(carbonate-siloxane). These polycarbonate compositions can advantageously be used in consumer electronic applications such as mobile phone adapter housing and USB connector applications.

The individual components of the polycarbonate compositions are described in more detail below.

The bisphenol A polycarbonate homopolymer, also referred to as bisphenol A homopolycarbonate, has repeating structural carbonate units of the formula (1).

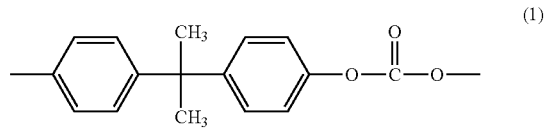

Bisphenol A polycarbonate homopolymers can be manufactured by processes such as interfacial polymerization and melt polymerization, which are known, and are described, for example, in WO 2013/175448 A1 and WO 2014/072923 A1, from bisphenol A ((2,2-bis(4-hydroxyphenyl)propane, or BPA). An endcapping agent can be included during polymerization to provide end groups, for example monocyclic phenols such as phenol, p-cyanophenol, and $C_1$-$C_{22}$alkyl-substituted phenols such as p-cumyl-phenol, resorcinol monobenzoate, and p-tertiary-butyl phenol, monoethers of diphenols, such as p-methoxyphenol, monoesters of diphenols such as resorcinol monobenzoate, functionalized chlorides of aliphatic monocarboxylic acids such as acryloyl chloride and methacryoyl chloride, and mono-chloroformates such as phenyl chloroformate, alkyl-substituted phenyl chloroformates, p-cumyl phenyl chloroformate, and toluene chloroformate. Phenol and para-cumylphenol are specifically mentioned. Combinations of different endcapping agents can be used. Branched polycarbonate blocks can be prepared by adding a branching agent during polymerization, for example trimellitic acid, trimellitic anhydride, trimellitic trichloride, tris-p-hydroxyphenylethane, isatin-bis-phenol, tris-phenol TC (1,3,5-tris((p-hydroxyphenyl)isopropyl)benzene), tris-phenol PA (4(4(1,1-bis(p-hydroxyphenyl)-ethyl) alpha, alpha-dimethyl benzyl) phenol), 4-chloroformyl phthalic anhydride, trimesic acid, and benzophenone tetracarboxylic acid. The branching agents can be added at a level of 0.05 to 2.0 wt %. Combinations comprising linear polycarbonates and branched polycarbonates can be used.

In an embodiment, the bisphenol A polycarbonate homopolymer is a linear bisphenol A polycarbonate homopolymer, optionally endcapped with phenol or para-cumylphenol, and having a weight average molecular weight of 10,000 to 100,000 Daltons (Da), preferably 15,000 to 50,000 Da, more preferably 17,000 to 35,000 Da, as measured by gel permeation chromatography (GPC), using a crosslinked styrene-divinylbenzene column and calibrated to bisphenol A polycarbonate references. GPC samples are prepared at a concentration of 1 mg per ml, and are eluted at a flow rate of 1.5 ml per minute.

More than one bisphenol A polycarbonate homopolymer can be present. For example, the polycarbonate compositions can comprise a first bisphenol A polycarbonate homopolymer having a weight average molecular weight of 15,000 to 25,000 Da or 17,000 to 23,000 Da or 18,000 to 22,000 Da. and a second bisphenol A polycarbonate homopolymer having a weight average molecular weight of 26,000 to 40,000 Da or 26,000 to 35,000 Da, each measured by GPC using BPA homopolycarbonate standards. The weight ratio of the first bisphenol A polycarbonate homopolymer relative to the second bisphenol A polycarbonate homopolymer is 10:1 to 1:10, preferably 5:1 to 1:5, more preferably 3:1 to 1:3 or 2:1 to 1:2. In an embodiment, the 10 to 99 wt %, 10 to 99 wt %, 50 to 99 wt %, 75 to 99 wt %, 85 to 98 wt %, or 86 to 96 wt % of one or more bisphenol A homopolycarbonates based on the total weight of the polycarbonate compositions. In another embodiment, the polycarbonate compositions comprise 10 to 95 wt %, 50 to 95 wt %, or 70 to 95 wt %, of one or more bisphenol A polycarbonate homopolymers based on the total weight of the polycarbonate compositions.

The compositions further comprise a poly(carbonate-siloxane), also known as a polycarbonate-polysiloxane copolymer. The poly(carbonate-siloxane) comprises carbonate units and siloxane units. The carbonate units may be derived from a dihydroxy aromatic compound such as a bisphenol of formula (2) or a diphenol of formula (3)

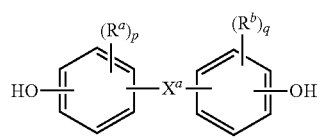

(2)

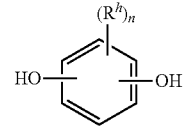

(3)

wherein in formula (2) $R^a$ and $R^b$ are each independently $C_{1-12}$ alkyl, $C_{1-12}$ alkenyl, $C_{3-8}$ cycloalkyl, or $C_{1-12}$ alkoxy, p and q are each independently 0 to 4, and $X^a$ is a single bond, —O—, —S—, —S(O)—, —S(O)$_2$—, —C(O)—, a $C_{1-11}$ alkylidene of formula —C(R')(R$^d$)— wherein $R^c$ and $R^d$ are each independently hydrogen or $C_{1-10}$ alkyl, or a group of the formula —C(=R$^e$)— wherein $R^e$ is a divalent $C_{1-10}$ hydrocarbon group; and in formula (3), each $R^h$ is independently a halogen atom, for example bromine, a $C_{1-10}$ hydrocarbyl group such as a $C_{1-10}$ alkyl, a halogen-substituted $C_{1-10}$ alkyl, a $C_{6-10}$ aryl, or a halogen-substituted $C_{6-10}$ aryl, and n is 0 to 4.

In some embodiments in formulas (2) and (3), $R^a$ and $R^b$ are each independently $C_{1-3}$ alkyl or $C_{1-3}$ alkoxy, p and q are each independently 0 to 1, and $X^a$ is a single bond, —O—, —S(O)—, —S(O)$_2$—, —C(O)—, a $C_{1-11}$ alkylidene of formula —C(R')(R$^d$)— wherein $R^c$ and $R^d$ are each independently hydrogen or $C_{1-10}$ alkyl, each $R^h$ is independently bromine, a $C_{1-3}$ alkyl, a halogen-substituted $C_{1-3}$ alkyl, and n is 0 to 1.

Examples of bisphenol compounds (2) include BPA, 4,4'-dihydroxybiphenyl, 1,6-dihydroxynaphthalene, 2,6-dihydroxynaphthalene, bis(4-hydroxyphenyl)methane, bis(4-hydroxyphenyl)diphenylmethane, bis(4-hydroxyphenyl)-1-naphthylmethane, 1,2-bis(4-hydroxyphenyl)ethane, 1,1-bis (4-hydroxyphenyl)-1-phenylethane, 2-(4-hydroxyphenyl)-2-(3-hydroxyphenyl)propane, bis(4-hydroxyphenyl) phenylmethane, 2,2-bis(4-hydroxy-3-bromophenyl) propane, 1,1-bis(hydroxyphenyl)cyclopentane, 1,1-bis(4-hydroxyphenyl)cyclohexane, 1,1-bis(4-hydroxyphenyl) isobutene, 1,1-bis(4-hydroxyphenyl)cyclododecane, trans-2, 3-bis(4-hydroxyphenyl)-2-butene, 2,2-bis(4-hydroxyphenyl)adamantane, alpha, alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl)propane, 2,2-bis(4-hydroxyphenyl)hexafluoropropane, 1,1-dichloro-2,2-bis(4-hydroxyphenyl)ethylene, 1,1-dibromo-2,2-bis(4-hydroxyphenyl)ethylene, 1,1-dichloro-2,2-bis(5-phenoxy-4-hydroxyphenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis (4-hydroxyphenyl)ether, bis(4-hydroxyphenyl)ether, bis(4-hydroxyphenyl)sulfide, bis(4-hydroxyphenyl)sulfoxide, bis (4-hydroxyphenyl)sulfone, 9,9-bis(4-hydroxyphenyl) fluorene, 2,7-dihydroxypyrene, 6,6'-dihydroxy-3,3,3',3'-tetramethylspiro(bis)indane (spirobiindane bisphenol), 3,3-bis(4-hydroxyphenyl)phthalimide, 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6- dihydroxydibenzothiophene, and 2,7-dihydroxycarbazole. A combination comprising different bisphenol compounds can be used.

Examples of diphenol compounds (3) included resorcinol, substituted resorcinol compounds such as 5-methyl resorcinol, 5-ethyl resorcinol, 5-propyl resorcinol, 5-butyl resorcinol, 5-t-butyl resorcinol, 5-phenyl resorcinol, 5-cumyl resorcinol, 2,4,5,6-tetrafluoro resorcinol, 2,4,5,6-tetrabromo resorcinol, or the like; catechol; hydroquinone; substituted hydroquinones such as 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,3,5,6-tetramethyl hydroquinone, 2,3,5,6-tetra-t-butyl hydroquinone, 2,3,5,6-tetrafluoro hydroquinone, 2,3,5,6-tetrabromo hydroquinone, or the like. A combination comprising different diphenol compounds can be used.

In preferred embodiments the carbonate units can be bisphenol carbonate units derived from bisphenols of formula (2). A preferred bisphenol is BPA.

The siloxane units (also referred to as polysiloxane blocks) are optionally of formula (4)

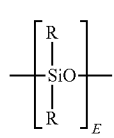
(4)

wherein each R is independently a $C_{1-13}$ monovalent organic group. For example, R can be a $C_{1-13}$ alkyl, $C_{1-13}$ alkoxy, $C_{2-13}$ alkenyl, $C_{2-13}$ alkenyloxy, $C_{3-6}$ cycloalkyl, $C_{3-6}$ cycloalkoxy, $C_{6-14}$ aryl, $C_{6-10}$ aryloxy, $C_{7-13}$ arylalkylene, $C_{7-13}$ arylalkylenoxy, $C_{7-13}$ alkylarylene, or $C_{7-13}$ alkylarylenoxy. The foregoing groups can be fully or partially halogenated with fluorine, chlorine, bromine, or iodine, or a combination thereof. In an embodiment, where a transparent poly(carbonate-siloxane) is desired, R is unsubstituted by halogen. Combinations of the foregoing R groups can be used in the same copolymer.

In an embodiment, R is a $C_{1-3}$ alkyl, $C_{1-3}$ alkoxy, $C_{3-6}$ cycloalkyl, $C_{3-6}$ cycloalkoxy, $C_{6-14}$ aryl, $C_{6-10}$ aryloxy, $C_7$ arylalkylene, $C_7$ arylalkylenoxy, $C_7$ alkylarylene, or $C_7$ alkylarylenoxy. In still another embodiment, R is methyl, trifluoromethyl, or phenyl.

The value of E in formula (4) can vary widely depending on the type and relative amount of each component in the polycarbonate composition, the desired properties of the composition, and like considerations. Generally, E has an average value of 2 to 1,000, or 2 to 500, 2 to 200, or 2 to 125, 5 to 80, or 10 to 70. In an embodiment, E has an average value of 10 to 80 or 10 to 40, in still another embodiment, E has an average value of 40 to 80 or 40 to 70, and in yet another embodiment, E has an average value of 10 to 100, or 20 to 60, or 30 to 50.

In an embodiment, the siloxane units are of formula (5)

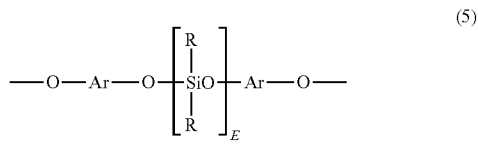
(5)

wherein E is as defined above in the context of formula (4); each R can be the same or different, and is as defined above in the context of formula (4); and Ar can be the same or different, and is a substituted or unsubstituted $C_{6-30}$ arylene, wherein the bonds are directly connected to an aromatic moiety. Ar groups in formula (5) can be derived from a $C_{6-30}$ dihydroxyarylene compound, for example a dihydroxy compound of formula (3). Exemplary dihydroxyarylene compounds are 1,1-bis(4-hydroxyphenyl) methane, 1,1-bis(4-hydroxyphenyl) ethane, 2,2-bis(4-hydroxyphenyl) propane, 2,2-bis(4-hydroxyphenyl) butane, 2,2-bis(4-hydroxyphenyl) octane, 1,1-bis(4-hydroxyphenyl) propane, 1,1-bis(4-hydroxyphenyl) n-butane, 2,2-bis(4-hydroxy-1-methylphenyl) propane, 1,1-bis(4-hydroxyphenyl) cyclohexane, bis(4-hydroxyphenyl sulfide), and 1,1-bis(4-hydroxy-t-butylphenyl) propane, or a a combination thereof.

Specific examples of siloxane units of formula (5) include those of the formulas (5a) and (5b).

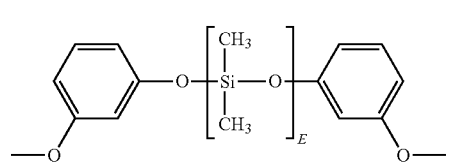
(5a)

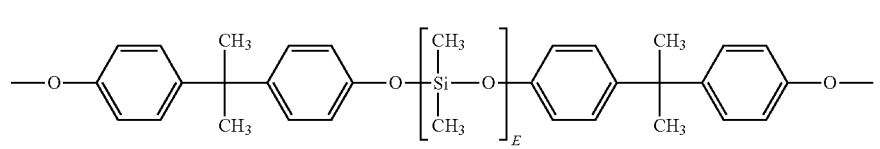
(5b)

In another embodiment, the siloxane units are of formula (6)

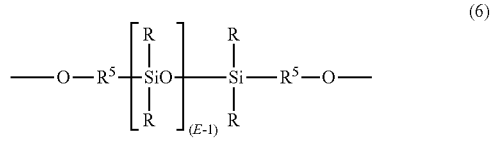
(6)

wherein R and E are as described above in the context of formula (4), and each $R^5$ is independently a divalent $C_1$-$C_{30}$ organic group, and wherein the polymerized polysiloxane unit is the reaction residue of its corresponding dihydroxy compound. In a specific embodiment, the polydiorganosiloxane blocks are of formula (7):

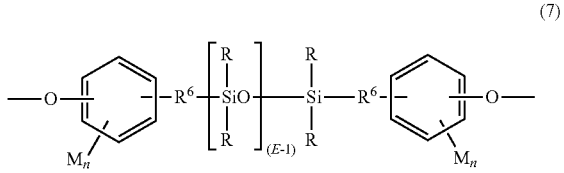

(7)

wherein R and E are as defined above in the context of formula (4). $R^6$ in formula (7) is a divalent $C_{2-8}$ aliphatic. Each M in formula (7) can be the same or different, and can be a halogen, cyano, nitro, $C_{1-8}$ alkylthio, $C_{1-8}$ alkyl, $C_{1-8}$alkoxy, $C_{2-8}$ alkenyl, $C_{2-8}$-alkenyloxy, $C_{3-8}$ cycloalkyl, $C_{3-8}$ cycloalkoxy, $C_{6-10}$ aryl, $C_{6-10}$ aryloxy, $C_{7-12}$ aralkyl, $C_{7-12}$ arylalkylenoxy, $C_{7-12}$ alkylarylene, or $C_{7-12}$ alkylarylenoxy, wherein each n is independently 0, 1, 2, 3, or 4.

In an embodiment, M is bromo or chloro, an alkyl such as methyl, ethyl, or propyl, an alkoxy such as methoxy, ethoxy, or propoxy, or an aryl such as phenyl, chlorophenyl, or tolyl; $R^6$ is a dimethylene, trimethylene or tetramethylene; and R is a $C_{1-8}$ alkyl, haloalkyl such as trifluoropropyl, cyanoalkyl, or aryl such as phenyl, chlorophenyl or tolyl. In another embodiment, R is methyl, or a combination of methyl and trifluoropropyl, or a combination of methyl and phenyl. In still another embodiment, R is methyl, M is methoxy, n is one, and $R^6$ is a divalent $C_{1-3}$ aliphatic group. Specific polydiorganosiloxane blocks are of the formula

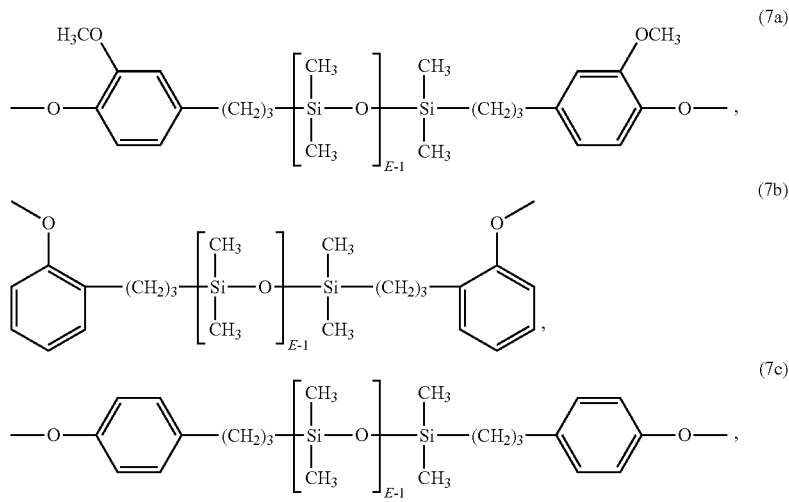

or a combination thereof, wherein E has an average value of 10 to 100, preferably 20 to 60, more preferably 30 to 50, or 40 to 50.

Blocks of formula (7) can be derived from the corresponding dihydroxy polydiorganosiloxanes by known methods. The poly(carbonate-siloxane) can be manufactured by introducing phosgene under interfacial reaction conditions into a mixture of bisphenol and an end capped polydimethylsiloxane (PDMS). Other known methods can also be used.

In an embodiment, the poly(carbonate-siloxane) comprises carbonate units derived from bisphenol A, and repeating siloxane units (5a), (5b), (7a), (7b), (7c), or a combination thereof (preferably of formula 7a), wherein E has an average value of 10 to 100, preferably 20 to 80, or 30 to 70, more preferably 30 to 50 or 40 to 50.

The poly(carbonate-siloxane) can have a siloxane content of 30 to 70 wt %, preferably 35 to 65 wt %, each based on the total weight of the poly(carbonate-siloxane). In some embodiments, the poly(carbonate-siloxane) can have a siloxane content of 30 to 70 wt %, preferably or 35 to 65 wt. %, each based on the total weight of the poly(carbonate-siloxane). As used herein, "siloxane content" of a poly (carbonate-siloxane) refers to the content of siloxane units based on the total weight of the polysiloxane-polycarbonate copolymer. The poly(carbonate-siloxane) can have a weight average molecular weight of 26,000 to 40,000 Da, preferably 30,000 to 40,000 Da, or 32,000 to 36,000 Da. In another embodiment, the poly(carbonate-siloxane) can have a weight average molecular weight of 26,000 to 45,000 Da, or 30,000 to 45,000 Da, or 35,000 to 40,000 Da. The weight average molecular weight can be measured by gel permeation chromatography using a crosslinked styrene-divinyl benzene column, at a sample concentration of 1 milligram per milliliter, and as calibrated with bisphenol A polycarbonate standards.

In an embodiment the poly(carbonate-siloxane) is an elastomer as described, for example, in U.S. Pat. No. 84,666, 249 to Gallucci et al. In a preferred embodiment, the poly(carbonate-siloxane) elastomer can have at least 30% elongation before yield as measured by ASTM D638; a percent transmission (% T) of 70% or greater, and a haze level of 10% or less, when measured at 1.0 mm thickness according to ASTM D1003; a yellowness index of 10 or less, when measured according to ASTM D6290; and a Shore D hardness of from 5 to 20 as measured by ASTM D2240. In a preferred embodiment, the poly(carbonate-siloxane) elastomer has bisphenol A carbonate units and dimethyl siloxane units.

The poly(carbonate-siloxane) can be present in the polycarbonate compositions in an amount of 1 to 20 wt % or 2 to 15 wt %, based on the total weight of the compositions. Alternatively, the poly(carbonate-siloxane) can be present in the polycarbonate compositions in an amount of 5 to 15 wt %, or 8 to 14 wt %, or 1 to 6 wt %, or 2 to 5 wt % based on the total weight of the compositions. The amount of the poly(carbonate-siloxane) can be adjusted based on siloxane content, e.g., poly(carbonate-siloxane) having 60 wt % siloxane can be present in an amount of 1 to 6 wt %, or 2 to 5 wt % based on the total weight of the compositions, and poly(carbonate-siloxane) having 40 wt % siloxane can be present in an amount of 5 to 15 wt %, or 8 to 14 wt %, based on the total weight of the compositions.

In an embodiment, the polycarbonate compositions further comprise a second poly(carbonate-siloxane) having a siloxane content of 5 to 25 wt %, preferably 10 to 25 wt %, more preferably 15 to 25 wt %, based on the total weight of the second poly(carbonate-siloxane). The second poly(carbonate-siloxane) optionally can have a weight average molecular weight of 18,000 to 40,000 Da, preferably 25,000 to 35,000 Da, more preferably 27,000 to 32,000 Da as measured by gel permeation chromatography using a cross-linked styrene-divinyl benzene column, at a sample concentration of 1 milligram per milliliter, and as calibrated with bisphenol A polycarbonate standards. The second poly(carbonate-siloxane) can be present optionally in an amount of 1 to 90 wt %, preferably 5 to 30 wt %, more preferably 10 to 25 wt %, based on the total weight of the polycarbonate compositions.

In another embodiment, the compositions are free of a poly(carbonate-siloxane) with a siloxane content of less than 30 wt %, based on the total weight of the poly(carbonate-siloxane).

The polycarbonate compositions can have optionally a total siloxane content of 0.5 to 10 wt %, 1 to 8 wt %, 1 to 6 wt %, or 1.5 to 4 wt %, each based on the total weight of the polycarbonate compositions.

The polycarbonate compositions can have good chemical resistance when certain impact modifiers are present. The impact modifiers can include a silicone-based impact modifier different from the poly(carbonate-siloxane) copolymer, a methyl methacrylate-butadiene-styrene copolymer; or a combination thereof. The impact modifier is optionally present in an amount of 1 to 10 wt %, 2 to 8 wt %, or 3 to 6 wt % based on the total weight of the polycarbonate compositions.

The silicone-based impact modifier can be a silicone graft copolymer. In an embodiment, a silicone graft copolymer is a silicone core-shell graft copolymer prepared by grafting ethylenically unsaturated monomers onto a rubbery silicone core, thus forming a rigid shell. Methods for preparing the silicone core-shell graft copolymers are known in the art. For example, silicone core-shell graft copolymers can be prepared by methods disclosed in U.S. Pat. No. 7,615,594, or in Abele et al., "Silicone-based Flame Retardant for Polycarbonate," *ANTEC*, 2009, pp. 1351-1354.

The ethylenically unsaturated monomers used to form the shell can be a combination of a monofunctional monomer and a copolymerizable polyfunctional monomer. Examples of monofunctional monomers include styrene, α-methylstyrene, halogen or $C_{1-3}$ alkyl substituted styrene, acrylonitrile, methacrylonitrile, maleic acid, maleic anhydride, $C_{1-4}$ alkyl and phenyl N-substituted maleimide, $C_{1-8}$ alkyl methacrylates, $C_{1-8}$ alkyl acrylates, and the like. Example of copolymerizable polyfunctional monomers include allyl methacrylate, triallyl cyanurate, triallyl isocyanurate, diallyl phthalate, ethylene glycol dimethacrylate, 1,3-butylene glycol dimethacrylate, divinyl benzene, and the like. Preferred monomers are the $C_{1-8}$ alkyl methacrylates, $C_{1-8}$ alkyl acrylates, more preferably $C_{1-6}$ alkyl methacrylates.

The rubbery silicone core can be prepared by polymerization of a cyclosiloxane in the presence of a curing agent to produce particles. The particles can have an average diameter of 0.1 to 1 micrometer. Examples of cyclosiloxanes include hexamethylcyclotrisiloxane, octamethylcyclotetrasiloxane, decamethylcyclopentasiloxane, dodecamethylcyclohexasiloxane, trimethyltriphenylcyclotrisiloxane, tetramethyltetraphenylcyclotetrosiloxane, octaphenylcyclotetrasiloxane, and the like. Examples of curing agents include reactive silanes, for example trimethoxymethylsilane, tetramethoxysilane, tetraethoxysilane, and the like. The silicone core can comprise 20 to 100 wt % of silicone, or 30 to 95 wt % of silicone, with the remainder of the core being rubber groups.

The rubber content of the silicone-based core-shell graft copolymer can be in the range of 30 to 90% by weight. In some embodiments, the silicone core-shell graft copolymer comprises or 60 to 80 wt %, or 60 to 70 wt %, or 65 to 75 wt % of the silicone core component, wherein the graft shell component is derived from primarily $C_{1-6}$ alkyl methacrylates. A commercially available silicone core-shell graft copolymer is sold under the tradename KANE ACE™ MR-01 by Kaneka Corporation (Japan).

Other specific examples of silicone-based impact modifiers include methacrylate, acrylate and dimethyl siloxane (PDMS) copolymers, such as METABLEN S-2030, METABLEN s-2001, METABLEN S-2100, and the like available from MITSUBISHI RAYON.

In addition to the bisphenol A polycarbonate homopolymer and the poly(siloxane-carbonate)s, the polycarbonate compositions can optionally include various additives ordinarily incorporated into polymer compositions of this type, with the proviso that the additive(s) are selected so as to not significantly adversely affect the desired properties of the polycarbonate composition, in particular impact, chemical resistance, and aesthetics. Additives include fillers, reinforcing agents, antioxidants, heat stabilizers, light stabilizers, ultraviolet (UV) light stabilizers, plasticizers, lubricants, mold release agents, antistatic agents, colorants such as such as titanium dioxide, carbon black, and organic dyes, surface effect additives, radiation stabilizers, flame retardants, and anti-drip agents. A combination of additives can be used, for example a combination of a heat stabilizer, mold release agent, and ultraviolet light stabilizer. In general, the additives are used in the amounts generally known to be effective. For example, the total amount of the additives (other than any impact modifier, filler, or reinforcing agents) can be 0.01 to 5 wt %, based on the total weight of the polycarbonate composition. In an embodiment, the polycarbonate composition comprises no more than 5 wt % based on the weight of the composition of a processing aid, a heat stabilizer, an antioxidant, an ultra violet light absorber, or a combination thereof.

The polycarbonate compositions can optionally include a colorant composition containing pigment and/or dye additives. Useful pigments can include, for example, inorganic pigments such as metal oxides and mixed metal oxides such as zinc oxide, titanium dioxides, iron oxides, or the like; sulfides such as zinc sulfides, or the like; aluminates; sodium sulfo-silicates sulfates, chromates, or the like; carbon blacks; zinc ferrites; ultramarine blue; organic pigments such as azos, di-azos, quinacridones, perylenes, naphthalene tetracarboxylic acids, flavanthrones, isoindolinones, tetrachloroisoindolinones, anthraquinones, enthrones, dioxazines, phthalocyanines, and azo lakes; Pigment Red 101, Pigment Red 122, Pigment Red 149, Pigment Red 177, Pigment Red 179, Pigment Red 202, Pigment Violet 29, Pigment Blue 15, Pigment Blue 60, Pigment Green 7, Pigment Yellow 119, Pigment Yellow 147, Pigment Yellow 150, and Pigment Brown 24; or a combination thereof.

Dyes can be organic materials and include coumarin dyes such as coumarin 460 (blue), coumarin 6 (green), nile red or the like; lanthanide complexes; hydrocarbon and substituted hydrocarbon dyes; polycyclic aromatic hydrocarbon dyes;

scintillation dyes such as oxazole or oxadiazole dyes; aryl- or heteroaryl-substituted poly ($C_{2-8}$) olefin dyes; carbocyanine dyes; indanthrone dyes; phthalocyanine dyes; oxazine dyes; carbostyryl dyes; napthalenetetracarboxylic acid dyes; porphyrin dyes; bis(styryl)biphenyl dyes; acridine dyes; anthraquinone dyes; cyanine dyes; methine dyes; arylmethane dyes; azo dyes; indigoid dyes, thioindigoid dyes, diazonium dyes; nitro dyes; quinone imine dyes; aminoketone dyes; tetrazolium dyes; thiazole dyes; perylene dyes, perinone dyes; bis-benzoxazolylthiophene (BBOT); triarylmethane dyes; xanthene dyes; thioxanthene dyes; naphthalimide dyes; lactone dyes; fluorophores such as anti-stokes shift dyes which absorb in the near infrared wavelength and emit in the visible wavelength, or the like; luminescent dyes such as 7-amino-4-methylcoumarin; 3-(2'-benzothiazolyl)-7-diethylaminocoumarin; 2-(4-biphenylyl)-5-(4-t-butylphenyl)-1,3,4-oxadiazole; 2,5-bis-(4-biphenylyl)-oxazole; 2,2'-dimethyl-p-quaterphenyl; 2,2-dimethyl-p-terphenyl; 3,5,3'''',5''''-tetra-t-butyl-p-quinquephenyl; 2,5-diphenylfuran; 2,5-diphenyloxazole; 4,4'-diphenylstilbene; 4-dicyanomethylene-2-methyl-6-(p-dimethylaminostyryl)-4H-pyran; 1,1'-diethyl-2,2'-carbocyanine iodide; 3,3'-diethyl-4,4',5,5'-dibenzothiatricarbocyanine iodide; 7-dimethylamino-1-methyl-4-methoxy-8-azaquinolone-2; 7-dimethylamino-4-methylquinolone-2; 2-(4-(4-dimethylaminophenyl)-1,3-butadienyl)-3-ethylbenzothiazolium perchlorate; 3-diethylamino-7-diethyliminophenoxazonium perchlorate; 2-(1-naphthyl)-5-phenyloxazole; 2,2'-p-phenylen-bis(5-phenyloxazole); rhodamine 700; rhodamine 800; pyrene, chrysene, rubrene, coronene, or the like; or a combination thereof.

The compositions can have any suitable color including white, gray, light gray, black, and the like. The white or light gray color can exhibit an L* value greater than or equal to 80. A composition having a white or light gray color can comprise an amount of titanium dioxide in amounts of 0.1 to 30 wt %, 0.1 to 25 wt %, 0.1 to 20 wt %, or 0.1 to 15 wt %, each based on the total weight of the polycarbonate composition.

The gray or black color can exhibit an L* value of below 80. A composition having a gray or black color can comprise an amount of carbon black of greater than zero and less than 1.5 wt % based on the total weight of the colorant composition. In an embodiment, a molded sample having a thickness of 1 mm formed from the composition has an average L* value of 29 or less as measure by the CIE Lab method, 10 degree observer, D65 illuminant, specular component included, measured in reflectance mode.

In an embodiment, the polycarbonate compositions comprise up to 10 wt % of titanium dioxide, carbon black, an inorganic pigment, an organic pigment, a dye, or a combination thereof, based on the total weight of the compositions.

The polycarbonate compositions can optionally include flame retardants. Various types of flame retardants can be utilized. In one embodiment, the flame retardant additives include, for example, flame retardant salts such as alkali metal salts of perfluorinated $C_1$-$C_{16}$ alkyl sulfonates such as potassium perfluorobutane sulfonate (Rimar salt), potassium perfluoroctane sulfonate, tetraethylammonium perfluorohexane sulfonate, potassium diphenylsulfone sulfonate (KSS), and the like, sodium benzene sulfonate, sodium toluene sulfonate (NATS) and the like; and salts formed by reacting for example an alkali metal or alkaline earth metal (for example lithium, sodium, potassium, magnesium, calcium and barium salts) and an inorganic acid complex salt, for example, an oxo-anion, such as alkali metal and alkaline-earth metal salts of carbonic acid, such as $Na_2CO_3$, $K_2CO_3$, $MgCO_3$, $CaCO_3$, and $BaCO_3$ or fluoro-anion complex such as $Li_3AlF_6$, $BaSiF_6$, $KBF_4$, $K_3AlF_6$, $KAF_4$, $K_2SiF_6$, and/or $Na_3AlF_6$ or the like. Rimar salt and KSS and NATS, alone or in combination with other flame retardants, are particularly useful in the compositions disclosed herein.

Organophosphorus flame retardants can be used. Organophosphorus compounds include aromatic organophosphorus compounds having at least one organic aromatic group and at least one phosphorus-containing group, as well as organic compounds having at least one phosphorus-nitrogen bond.

In the aromatic organophosphorus compounds that have at least one organic aromatic group, the aromatic group can be a substituted or unsubstituted $C_{3-30}$ group containing one or more of a monocyclic or polycyclic aromatic moiety (which can optionally contain with up to three heteroatoms (N, O, P, S, or Si)) and optionally further containing one or more nonaromatic moieties, for example alkyl, alkenyl, alkynyl, or cycloalkyl. The aromatic moiety of the aromatic group can be directly bonded to the phosphorus-containing group, or bonded via another moiety, for example an alkylene group. The aromatic moiety of the aromatic group can be directly bonded to the phosphorus-containing group, or bonded via another moiety, for example an alkylene group. In an embodiment the aromatic group is the same as an aromatic group of the polycarbonate backbone, such as a bisphenol group (e.g., bisphenol A), a monoarylene group (e.g., a 1,3-phenylene or a 1,4-phenylene), or a combination thereof.

The phosphorus-containing group can be a phosphate (P(=O)(OR)$_3$), phosphite (P(OR)$_3$), phosphonate (RP(=O)(OR)$_2$), phosphinate (R$_2$P(=O)(OR)), phosphine oxide (R$_3$P(=O)), or phosphine (R$_3$P), wherein each R in the foregoing phosphorus-containing groups can be the same or different, provided that at least one R is an aromatic group. A combination of different phosphorus-containing groups can be used. The aromatic group can be directly or indirectly bonded to the phosphorus, or to an oxygen of the phosphorus-containing group (i.e., an ester).

In an embodiment the aromatic organophosphorus compound is a monomeric phosphate. Representative monomeric aromatic phosphates are of the formula (GO)$_3$P=O, wherein each G is independently an alkyl, cycloalkyl, aryl, alkylarylene, or arylalkylene group having up to 30 carbon atoms, provided that at least one G is an aromatic group. Two of the G groups can be joined together to provide a cyclic group. In some embodiments G corresponds to a monomer used to form the polycarbonate, e.g., resorcinol. Exemplary phosphates include phenyl bis(dodecyl) phosphate, phenyl bis(neopentyl) phosphate, phenyl bis(3,5,5'-trimethylhexyl) phosphate, ethyl diphenyl phosphate, 2-ethylhexyl di(p-tolyl) phosphate, bis(2-ethylhexyl) p-tolyl phosphate, tritolyl phosphate, bis(2-ethylhexyl) phenyl phosphate, tri(nonylphenyl) phosphate, bis(dodecyl) p-tolyl phosphate, dibutyl phenyl phosphate, 2-chloroethyl diphenyl phosphate, p-tolyl bis(2,5,5'-trimethylhexyl) phosphate, 2-ethylhexyl diphenyl phosphate, and the like. A specific aromatic phosphate is one in which each G is aromatic, for example, triphenyl phosphate, tricresyl phosphate, isopropylated triphenyl phosphate, and the like.

Di- or polyfunctional aromatic organophosphorus compounds are also useful, for example, compounds of the formulas

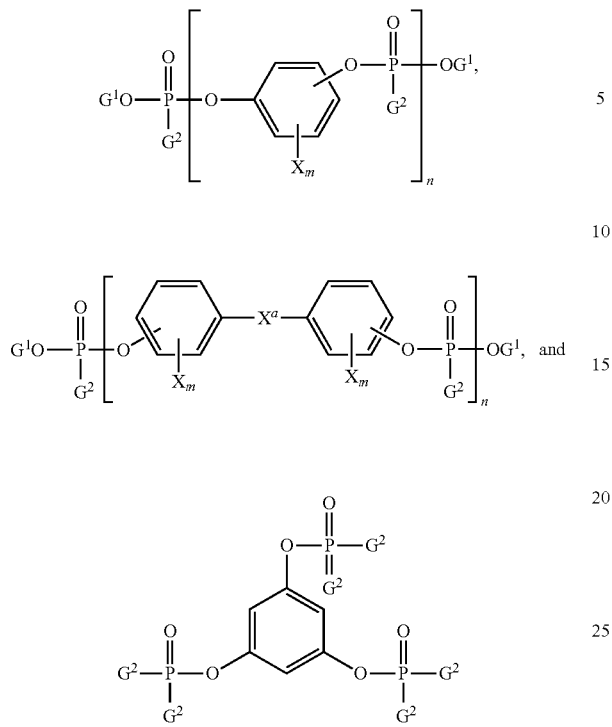

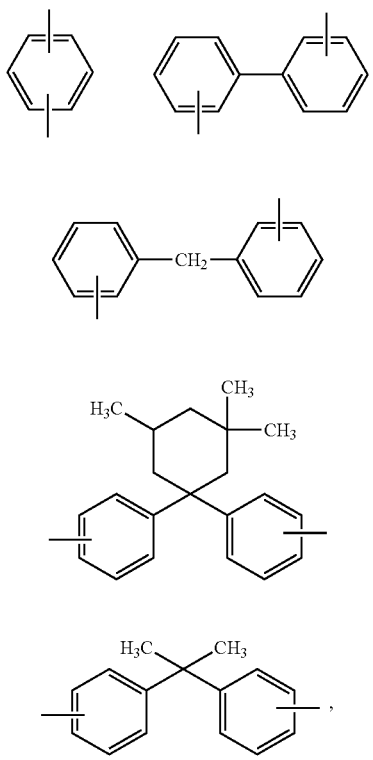

wherein each $G^1$ is independently a $C_{1-30}$ hydrocarbyl; each $G^2$ is independently a $C_{1-30}$ hydrocarbyl or hydrocarbyloxy; $X^a$ is as defined in formula (3) or formula (4); each X is independently a bromine or chlorine; m is 0 to 4, and n is 1 to 30. In a specific embodiment, $X^a$ is a single bond, methylene, isopropylidene, or 3,3,5-trimethylcyclohexylidene.

Specific aromatic organophosphorus compounds are inclusive of acid esters of formula (9)

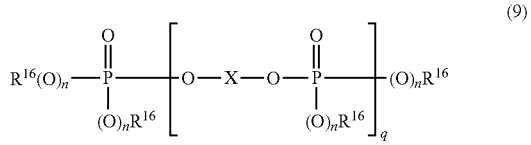

(9)

wherein each $R^{16}$ is independently $C_{1-8}$ alkyl, $C_{5-6}$ cycloalkyl, $C_{6-20}$ aryl, or $C_{7-12}$ arylalkylene, each optionally substituted by $C_{1-12}$ alkyl, specifically by $C_{1-4}$ alkyl and X is a mono- or poly-nuclear aromatic $C_{6-30}$ moiety or a linear or branched $C_{2-30}$ aliphatic radical, which can be OH-substituted and can contain up to 8 ether bonds, provided that at least one $R^{16}$ or X is an aromatic group; each n is independently 0 or 1; and q is from 0.5 to 30. In some embodiments each $R^{16}$ is independently $C_{1-4}$ alkyl, naphthyl, phenyl($C_{1-4}$)alkylene, aryl groups optionally substituted by $C_{1-4}$ alkyl; each X is a mono- or poly-nuclear aromatic $C_{6-30}$ moiety; each n is 1; and q is from 0.5 to 30. In some embodiments each $R^{16}$ is aromatic, e.g., phenyl; each X is a mono- or poly-nuclear aromatic $C_{6-30}$ moiety, including a moiety derived from formula (2); n is one; and q is from 0.8 to 15. In other embodiments, each $R^{16}$ is phenyl; X is cresyl, xylenyl, propylphenyl, or butylphenyl, one of the following divalent groups or a combination comprising one or more of the foregoing; n is 1; and q is from 1 to 5, or from 1 to 2. In some embodiments at least one $R^{16}$ or X corresponds to a monomer used to form the polycarbonate, e.g., bisphenol A, resorcinol, or the like. Aromatic organophosphorus compounds of this type include the bis(diphenyl) phosphate of hydroquinone, resorcinol bis(diphenyl phosphate) (RDP), and bisphenol A bis(diphenyl) phosphate (BPADP), and their oligomeric and polymeric counterparts.

The organophosphorus flame retardant containing a phosphorus-nitrogen bond can be a phosphazene, phosphonitrilic chloride, phosphorus ester amide, phosphoric acid amide, phosphonic acid amide, phosphinic acid amide, or tris (aziridinyl) phosphine oxide. These flame-retardant additives are commercially available. In an embodiment, the organophosphorus flame retardant containing a phosphorus-nitrogen bond is a phosphazene or cyclic phosphazene of the formulas

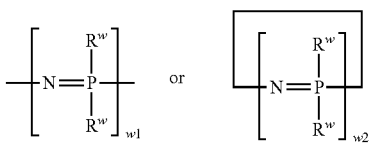

wherein w1 is 3 to 10,000; w2 is 3 to 25, or 3 to 7; and each R is independently a $C_{1-12}$ alkyl, alkenyl, alkoxy, aryl, aryloxy, or polyoxyalkylene group. In the foregoing groups at least one hydrogen atom of these groups can be substituted with a group having an N, S, O, or F atom, or an amino group. For example, each $R^w$ can be a substituted or unsubstituted phenoxy, an amino, or a polyoxyalkylene group. Any given $R^w$ can further be a crosslink to another phosphazene group. Exemplary crosslinks include bisphenol groups, for example bisphenol A groups. Examples include phenoxy cyclotriphosphazene, octaphenoxy cyclotetraphosphazene decaphenoxy cyclopentaphosphazene, and the like. A combination of different phosphazenes can be used. A number of phosphazenes and their synthesis are described in H. R. Allcook, "Phosphorus-Nitrogen Compounds" Academic Press (1972), and J. E. Mark et al., "Inorganic Polymers" Prentice-Hall International, Inc. (1992).

A brominated flame retardant can be used. Specific brominated polycarbonate, i.e., a polycarbonate containing brominated carbonate includes units derived from 2,2',6,6'-tetrabromo-4,4'-isopropylidenediphenol (TBBPA) and carbonate units derived from at least one dihydroxy aromatic compound that is not TBBPA. The dihydroxy aromatic compound can be of formula (3), more preferably dihydroxy aromatic compound (3) containing no additional halogen atoms. In an embodiment, the dihydroxy aromatic compound is bisphenol A.

The relative ratio of TBBPA to the dihydroxy aromatic compound used to manufacture the TBBPA copolymer will depend in some embodiments on the amount of the TBBPA copolymer used and the amount of bromine desired in the polycarbonate composition. In an embodiment, the TBBPA copolymer is manufactured from a composition having 30 to 70 wt % of TBBPA and 30 to 70 wt % of the dihydroxy aromatic compound, preferably bisphenol A, or preferably 45 to 55 wt % of TBBPA and 45 to 55 wt % of the dihydroxy aromatic compound, preferably bisphenol A. In an embodiment, no other monomers are present in the TBBPA copolymer.

Combinations of different TBBPA copolymers can be used. Preferably, a TBBPA copolymer having phenol endcaps can be used. Also preferably, a TBBPA carbonate having 2,4,6-tribromophenol endcaps can be used.

The TBBPA copolymers have an Mw from 18,000 to 30,000 Da, preferably 20,000 to 30,000 Da as measured by gel permeation chromatography (GPC) using a crosslinked styrene-divinylbenzene column and calibrated to bisphenol A polycarbonate references.

A brominated flame retardant can also include a brominated oligomer. The term "brominated oligomer" is used herein for convenience to identify a brominated compound comprising at least two repeat units with bromine substitution, and having an Mw of less than 18,000 Da. The brominated oligomer can have an Mw of 1000 to 18,000 Da, preferably 2,000 to 15,000 Da, and more preferably 3,000 to 12,000 Da.

The brominated oligomer can be a brominated polycarbonate oligomer derived from brominated aromatic dihydroxy compounds (e.g., brominated compounds of formula (3)) and a carbonate precursor, or from a combination of brominated and non-brominated aromatic dihydroxy compounds, e.g., of formula (3), and a carbonate precursor. Brominated polycarbonate oligomers are disclosed, for example, in U.S. Pat. Nos. 4,923,933, 4,170,711, and 3,929,908. Examples of brominated aromatic dihydroxy compounds include 2,2-bis(3,5-dibromo-4-hydroxyphenyl)propane, bis(3,5-dibromo-4-hydroxyphenyl)menthanone, and 2,2',6,6'-tetramethyl-3,3',5,5'-tetrabromo-4,4'-biphenol.

Examples of non-brominated aromatic dihydroxy compounds for copolymerization with the brominated aromatic dihydroxy compounds include bisphenol A, bis(4-hydroxyphenyl) methane, 2, 2-bis(4-hydroxy-3-methylphenyl)propane, 4,4-bis(4-hydroxyphenyl)heptane, and (3,3'-dichloro-4,4'-dihydroxydiphenyl)methane. Combinations of two or more different brominated and non-brominated aromatic dihydroxy compounds can be used. If a combination of aromatic dihydroxy compounds is used, then the combinations can contain 25 to 55 mole percent of the brominated aromatic dihydroxy compounds and 75 to 65 mole percent of a non-brominated dihydric phenol. Branched brominated polycarbonate oligomers can also be used, as can compositions of a linear brominated polycarbonate oligomer and a branched brominated polycarbonate oligomer. Combinations of different brominated copolycarbonate oligomers can be used. Various endcaps can be present, for example polycarbonates having phenol endcaps or 2,4,6-tribromophenol endcaps can be used.

Other types of brominated oligomers can be used, for example brominated epoxy oligomers. Examples of brominated epoxy oligomers include those derived from bisphenol A, hydrogenated bisphenol A, bisphenol-F, bisphenol-S, novolac epoxies, phenol novolac epoxies, cresol novolac epoxies, N-glycidyl epoxies, glyoxal epoxies dicyclopentadiene phenolic epoxies, silicone-modified epoxies, and epsilon-caprolactone modified epoxies. Combinations of different brominated epoxy oligomers can be used. Preferably, a tetrabromobisphenol A epoxy having 2,4,6-tribromophenol endcaps can be used. An epoxy equivalent weight of 200 to 3000 can be used.

Specifically mentioned flame retardants include potassium diphenylsulfone sulfonate, sodium toluene sulfonate, potassium perfluorobutane sulphonate, bisphenol A bis(diphenyl phosphate), resorcinol bis(diphenyl phosphate), phenoxyphosphazene, a brominated polycarbonate, or a combination thereof.

The polycarbonate compositions can optionally comprise anti-drip agents. The anti-drip agent can be a fibril forming fluoropolymer such as polytetrafluoroethylene (PTFE). The anti-drip agent can be encapsulated by a rigid copolymer as described above, for example styrene-acrylonitrile copolymer (SAN). PTFE encapsulated in SAN is known as TSAN. Encapsulated fluoropolymers can be made by polymerizing the encapsulating polymer in the presence of the fluoropolymer, for example an aqueous dispersion. TSAN can provide significant advantages over PTFE, in that TSAN can be more readily dispersed in the composition. An exemplary TSAN can comprise 50 wt % PTFE and 50 wt % SAN, based on the total weight of the encapsulated fluoropolymer. The SAN can comprise, for example, 75 wt % styrene and 25 wt % acrylonitrile based on the total weight of the copolymer. Alternatively, the fluoropolymer can be preblended in some manner with a second polymer, such as for, example, an aromatic polycarbonate or SAN to form an agglomerated material for use as an anti-drip agent. Either method can be used to produce an encapsulated fluoropolymer.

The polycarbonate compositions can optionally further comprise a filler composition. The filler composition is present in an amount of 0.5 to 20 wt %, or 0.5 to 15 wt %, 0.5 to 5 wt % or 1 to 4 wt %, each based on the total weight of the polycarbonate compositions. In an embodiment, the filler composition comprises titanium dioxide.

The polycarbonate compositions can have good chemical resistance. In an embodiment, the polycarbonate compositions have a tensile strength retention of 80% and higher after exposure of an ASTM tensile bar for 168 hours to SANI-CLOTH AF3 at a temperature of 23° C. under 0.5% or 1% strain compared to a non-exposed reference tested at the same temperature, and a tensile elongation retention of 65% and higher after exposure of an ASTM tensile bar for 168 hours to SANI-CLOTH AF3 at a temperature of 23° C. under 0.5% or 1% strain compared to a non-exposed reference tested at the same temperature.

The polycarbonate compositions also optionally have a tensile strength retention of 80% and higher and a tensile elongation retention of 65% and higher after exposure of an ASTM tensile bar for 168 hours to SANI-CLOTH HB at a temperature of 23° C. under 0.5% or 1% strain compared to a non-exposed reference tested at the same temperature. The polycarbonate compositions also can have a tensile strength retention of 80% and higher and a tensile elongation retention of 65% and higher after exposure of an ASTM tensile bar for 168 hours to CAVICIDE at a temperature of 23° C. under 0.5% or 1% strain compared to a non-exposed reference tested at the same temperature.

The polycarbonate compositions can further have good flame retardant properties. In one aspect of measuring flame retardance, the UL94 standard utilizes a rating of V0 or V1, wherein a rating of V0 is better than V1. Using this standard, the polycarbonate compositions are formed into a molded article having a given thickness. The thinner the article, the more difficult it is to achieve a rating of V0 or V1. In one embodiment, a molded sample of the polycarbonate composition is capable of achieving UL94 V0 or V1 rating at a thickness of 1.5 mm (±10%).

The polycarbonate compositions can further have good impact properties in particular Izod notched impact and ductility. In an embodiment, the compositions have an Izod notched impact energy of at least 650 J/m, at least 670 J/m, or at least 680 J/m, measured at 23° C. on a sample of 3.2 mm thickness according to ASTM D256-10. The compositions can also have an Izod notched impact energy of at least 550 J/m, at least 580 J/m, or at least 600 J/m measured at −30° C. on a sample of 3.2 mm thickness according to ASTM D256-10. In some embodiments, the compositions have a ductility of 80% or greater, for example 100% at various temperatures such as 23° C., 10° C., 0° C., −10° C., −20° C., −30° C., and −50° C. measured at 23° C. on a sample of 3.2 mm thickness according to ASTM D256-10.

The polycarbonate compositions can further have good impact properties, in particular multiaxial impact (MAI) and ductility. The compositions can have an MAI equal to or higher than 40 J or equal to or higher than 45 J, determined at 23° C. at an impact speed of 3.3 m/second in accordance with ASTM D3763 on sample plaques with a thickness of 3.2 mm. The compositions can have a ductility in multiaxial impact of 80% and higher, preferably 100%, determined at 23° C. at an impact speed of 3.3 m/second in accordance with ASTM D3763 on sample plaques with a thickness of 3.2 mm. These values can be obtained in articles having a wide range of thicknesses, for example from 0.1 to 10 mm, or 0.5 to 5 mm. In some embodiments, the compositions can have an MAI equal to or higher than 50 J, equal to or greater than 55 J, and a high ductility (80% or greater, for example 100%) at lower temperatures such as 10° C., 0° C., −10° C., −20° C., or −30° C.

The polycarbonate compositions can further have good melt viscosities, which aid processing. The polycarbonate compositions have a melt flow rate (MFR, gram per 10 minutes (g/10 min) of 5 to 20 or 7 to 15, greater or equal to 5, or greater than or equal to 8, determined in accordance with ASTM D1238 under a load of 1.2 kg at 300° C.

The thermoplastic compositions can have a heat deflection temperature of 108° C. or higher or 120° C. or higher as measured on a sample plaque of 3.2 mm thickness at 1.82 MP according to ASTM D648.

The polycarbonate compositions can be manufactured by various methods known in the art. For example, powdered polycarbonate homopolymer, poly(carbonate-siloxane) and other optional components are first blended, optionally with any fillers, in a high speed mixer or by hand mixing. The blend is then fed into the throat of a twin-screw extruder via a hopper. Alternatively, at least one of the components can be incorporated into the composition by feeding it directly into the extruder at the throat and/or downstream through a sidestuffer, or by being compounded into a masterbatch with a desired polymer and fed into the extruder. The extruder is generally operated at a temperature higher than that necessary to cause the composition to flow. The extrudate can be immediately quenched in a water bath and pelletized. The pellets so prepared can be one-fourth inch long or less as desired. Such pellets can be used for subsequent molding, shaping, or forming.

Shaped, formed, casted, or molded articles comprising the polycarbonate compositions are also provided. The polycarbonate compositions can be molded into useful shaped articles by a variety of methods, such as injection molding, extrusion, rotational molding, blow molding, and thermoforming. The article can be a molded article, a thermoformed article, an extruded film, an extruded sheet, a honeycomb structure, one or more layers of a multi-layer article, a substrate for a coated article, and a substrate for a metallized article.

In some embodiments, the article can be a healthcare product such as a transfusion joint, a monitor housing, a syringe, a blood filter housing, a blood bag, a solution bag, an intravenous connector, a dialyzer, a catheter, a medical storage tray, a medical appliance, a medical tubing, a cardiac pacemaker and defibrillator, a cannula, an implantable prosthesis, a cardiac assist device, a heart valve, a vascular graft, an extra-corporeal device, an artificial organ, a pacemaker lead, a defibrillator lead, a blood pump, a balloon pump, a A-V shunt, a biosensor, a membrane for cell encapsulation, a wound dressing, an artificial joint, an orthopedic implant and syringe, a food tray, an animal cage, a cable sheathing, a structural component for pumps and vehicles, a mining ore screen, a mining conveyor belt, an aeronautical component, a chocolate mold, a watercooker component, a washer component, a dishwasher component, a or dishwasher safe article.

In some embodiments, the article can be a component of a consumer electronic device such as a gaming console, a gaming controller, a portable gaming device, a cellular telephone, a television, a personal computer, a tablet computer, a laptop computer, a personal digital assistant, a portable media player, a digital camera, a portable music player, an appliance, a power tool, a robot, a toy, a greeting card, a home entertainment system, a loudspeaker, or a soundbar.

In some embodiments, the article can be an electronic housing for an adapter, a cell phone, a smart phone, a GPS device, a laptop computer, a tablet computer, an e-reader, a copier, or a solar apparatus.

The article can be an automotive, scooter, or motorcycle exterior or interior component, and can be, for example, a panel, a quarter panel, a rocker panel, a trim, a fender, a battery cover, a door, a deck-lid, a trunk lid, a hood, a bonnet, a a roof, a a bumper, a a fascia, a a grille, a mirror housing, a pillar appliqué, a cladding, a body side molding, a wheel cover, a a hubcap, a door handle, a spoiler, a window frame, a headlamp bezel, a headlamp, a tail lamp, a tail lamp housing, a tail lamp bezel, a license plate enclosure, a roof rack, or a running board.

The above described and other features are exemplified by the following examples.

EXAMPLES

The materials used in the Examples are described in Table 1.

TABLE 1

| Item | Chemical Description | Source |
|---|---|---|
| PC1 | Linear Bisphenol A homopolycarbonate, produced via interfacial polymerization, Mw = 21,000 to 23,000 Da as determined by GPC using BPA homopolycarbonate standards, p-cumylphenol end-capped | SABIC |
| PC2 | Linear bisphenol A homopolycarbonate, produced via interfacial polymerization, Mw of 29,000 to 31,000 Da as determined by GPC using BPA homopolycarbonate standards, p-cumylphenol end-capped | SABIC |
| BrPC | Brominated Bisphenol A Polycarbonate, Mw = 23,000-25,0000 Da, 26 wt % Br | SABIC |
| SiPC20 | PDMS - bisphenol A copolycarbonate, 20 wt % siloxane, average PDMS block length of 45 units, Mw = 29,500 to 30,500 Da as determined by GPC using BPA polycarbonate standards, p-cumylphenol end-capped | SABIC |
| S1PC40-1 | PDMS - bisphenol A copolycarbonate, 40 wt % siloxane, average PDMS block length of 45 units, Mw = 31,500 to 32,500 Da as determined by GPC using BPA polycarbonate standards, p-cumylphenol end-capped | SABIC |
| S1PC40-2 | PDMS - bisphenol A copolycarbonate, 40 wt % siloxane, average PDMS block length of 45 units, Mw = 37,000 to 38,000 Da as determined by GPC using BPA polycarbonate standards, p-cumylphenol end-capped | SABIC |
| S1PC60 | PDMS - bisphenol A copolycarbonate, 60 wt % siloxane, average PDMS block length of 45 units, Mw = 33,500 to 34,500 Da as determined by GPC using homopolycarbonate standards, p-cumylphenol end-capped | SABIC |
| IM1 | Methyl methacrylate-butadiene-styrene (MBS) (PARALOID EXL2650A) | DOW |
| IM2 | Acrylate impact modifier (PARALOID EXL-3330) | DOW |
| IM3 | Methacrylate, acrylate and dimethylsiloxane co-polymer (METABLEN S-2001) | Mitsubishi Rayon |
| IM4 | Methacrylate, acrylate, and dimethylsiloxane co-polymer (METABLEN S-2100) | Mitsubishi Rayon |
| IM5 | Silicone polymer (KANE ACE MR01) | KANEKA |
| IM6 | Methacrylate, acrylate, and dimethylsiloxane co-polymer (METABLEN S-2030) | Mitsubishi Rayon |
| KSS | Potassium diphenylsulfone sulfonate | Metropolitan Eximchem Ltd. |
| TSAN | Styrene-acrylonitrile copolymer encapsulated PTFE | SABIC |
| UV | 2-[2-hydroxy-3,5-di-(1,1-dimethylbenzyl)]-2H-benzotriazol (Tinuvin 234) | BASF |
| AO | Tris(2,6 di tert-butylphenyl)phosphite (IRGAFOS 168) | BASF |
| PETS | Pentaerythritol tetrastearate | FACI S.p.A. |
| $TiO_2$ | Titanium dioxide (KRONOS 2233) | KRONOS |
| OB-1 | 2,2'-(1,2-ethenediyldi-4,1-phenylene)bisbenzoxazole | Eastman |
| CB | Carbon black (Monarch 800) | Cabot |
| SR52 | Solvent red 52 | Farbtex |
| PY53 | Pigment yellow 53 | BASF |

In the examples, unless otherwise specified, the percent of the components as well as the percent of siloxane are weight percent (wt %) based on the total weight of the composition.

Blending, Extrusion, and Molding Conditions

All raw materials were blended together and extruded on a 37 mm twin-screw extruder under the conditions shown in Table 2. The test specimens were molded with the under the conditions shown in Table 2.

TABLE 2

| Compounding Machine: Toshiba TEM-37BS twin-screw extruder (37 mm) | | | Injection Molding Machine: FANUC S-20001 | | |
|---|---|---|---|---|---|
| Zone 1 Temperature | ° C. | 50 | Pre-dry Time | h | 4 |
| Zone 2 Temperature | ° C. | 100 | Pre-dry Temperature | ° C. | 120 |
| Zone 3 Temperature | ° C. | 265 | Hopper Temperature | ° C. | 50 |
| Zone 4 Temperature | ° C. | 265 | Zone 1 Temperature | ° C. | 290 |
| Zone 5 Temperature | ° C. | 265 | Zones 2-3 Temperature | ° C. | 300 |
| Zone 6 Temperature | ° C. | 265 | Nozzle Temperature | ° C. | 300 |
| Zone 7 Temperature | ° C. | 265 | Mold Temperature | ° C. | 90 |
| Zone 8 Temperature | ° C. | 265 | Screw speed | rmp | 100 |
| Zone 9 Temperature | ° C. | 265 | Back pressure | $kgf/cm^2$ | 30 |
| Zone 10 Temperature | ° C. | 265 | Decompression | mm | 3 |
| Zone 11 Temperature | ° C. | 265 | Holding time | s | 7 |
| Die temperature | ° C. | 265 | Colling time | s | 20 |
| Scree speed | rmp | 400 | Switch point | mm | 10 |
| Throughput | kg/h | 40 | Injection speed | mm/s | 50 |
| | | | Holding pressure | $kgf/cm^2$ | 600 |
| | | | Max. Injection pressure | $kgf/cm^2$ | 800 |

Testing Methods.

Melt flow rate (MFR) was determined in accordance with ASTM D1238 under a load of 1.2 kg at 300° C. with a dwelling time of 300 s. Prior to the testing the pellets were pre-dried at 120° C. for 3 hours.

Notched Izod impact Strength (INI) was determined in accordance with ASTM D256-10 under a load of 5 lbf at different temperatures including a temperature of 23° C. or −30° C. All ASTM INI determinations were carried out on sample plaques of 3.2 mm thickness. For the test at −30° C., the test specimens were placed in the freezer for more than 4 hours then taken out for testing at room temperature within five seconds.

Multi-axial impact (MAI) was determined in accordance with ASTM D3763 at 3.3 m/s and a temperature of 23° C. or −30° C. All ASTM MAI determinations were carried out on sample plaques of 3.2 mm thickness. For the test at −30° C., the test specimens were placed in the freezer for more than 4 hours and taken out for testing at room temperature within five seconds.

Tensile properties were measured in accordance with ASTM D 638 at 50 mm/min at room temperature on standard ASTM tensile bars.

Flexural properties were measured in accordance with ASTM D 790 on a sample plaque of 3.2 mm thickness with a 100 mm span at a test speed of 2.54 mm/min.

Heat deflection temperature (HDT) was determined in accordance with ASTM D 648 on a sample plaque of 3.2 mm thickness at 1.82 MPa.

Flammability tests were performed following the procedure of Underwriter's Laboratory Bulletin 94 entitled "Tests for Flammability of Plastic Materials for Parts in Devices and Appliances" (ISBN 0-7629-0082-2), Fifth Edition, Dated Oct. 29, 1996, incorporating revisions through and including Dec. 12, 2003. Several ratings can be applied based on the rate of burning, time to extinguish, ability to resist dripping, and whether or not drips are burning. According to this procedure, materials can be classified as UL94 HB, V0, V1, V2, 5VA, or 5VB. The test specimens were aged at 23° C., 50% RH for more than 2 days or 70° C. for 168 hours before testing.

Environmental stress cracking resistance (ESCR) describes the accelerated failure of polymeric materials, as a combined effect of environment, temperature, and stress. The failure mainly depends on the characteristics of the material, chemical, exposure condition, and the magnitude of the stress. The ASTM tensile bars were clamped to a semicircular jig to impart a constant strain of 1.0%. The bars were than exposed to various sanitizers for seven days at 23° C.

EXAMPLES 1-11, 3'AND COMPARATIVE EXAMPLES 1-2 AND 4-9

Examples 1-11 and 3' and comparative examples 1-2 and 4-9 illustrate the effects of adding an impact modifier to blend of bisphenol polycarbonate homopolymer (PC1 and PC2) and a poly(carbonate-siloxane) having 60 wt % of siloxane (SiPC60) or 40 wt % siloxane (SiPC40-2) on chemical resistance, flame retardance, and mechanical properties. Formulations and results are shown in Tables 3 and 4.

TABLE 3

|  | Unit | CEx1 | CEx2 | Ex3' | CEx4 | CEx5 | CEx6 | CEx7 | CEx8 |
|---|---|---|---|---|---|---|---|---|---|
| Component |  |  |  |  |  |  |  |  |  |
| PC1 | wt % | 47.85 | 46.85 | 45.85 | 48.3 | 48.22 | 47.72 | 47.5 | 23.75 |
| PC2 | wt % | 47.85 | 46.85 | 45.85 | 48.3 | 48.22 | 47.72 | 47.5 | 71.25 |
| SiPC60 | wt % | 3 | 5 | 7 | 3 | 3 | 4 | 4 | 4 |
| SiPC40-2 |  |  |  |  |  |  |  |  |  |
| KSS | wt % | 0.3 | 0.3 | 0.3 |  | 0.16 | 0.16 | 0.3 | 0.3 |
| TSAN | wt % | 0.3 | 0.3 | 0.3 |  |  |  | 0.3 | 0.3 |
| UV | wt % | 0.3 | 0.3 | 0.3 |  |  |  |  |  |
| AO | wt % | 0.1 | 0.1 | 0.1 | 0.1 | 0.1 | 0.1 | 0.1 | 0.1 |
| PETS | wt % | 0.3 | 0.3 | 0.3 | 0.3 | 0.3 | 0.3 | 0.3 | 0.3 |
| $TiO_2$ | wt % | 2.5 | 2.5 | 2.5 | 1.811 | 1.811 | 1.811 | 1.811 | 1.811 |
| OB-1 | wt % | 0.009 | 0.009 | 0.009 |  |  |  |  |  |
| CB | wt % |  |  |  | 0.0009 | 0.0009 | 0.0009 | 0.0009 | 0.0009 |
| SR52 | wt % |  |  |  | 0.0007 | 0.0007 | 0.0007 | 0.0007 | 0.0007 |
| PY53 | wt % |  |  |  | 0.0217 | 0.0217 | 0.0217 | 0.0217 | 0.0217 |
| Mechanical Properties |  |  |  |  |  |  |  |  |  |
| MFR (300° C. 1.2 kg) | g/10 min | 13.6 | 13.7 | 14.3 | 12.9 | 12.4 | 12.9 | 11.9 | 8.9 |
| INI at 23° C. | J/m | 847 | 828 | 825 | 763 | 871 | 852 | 834 | 892 |
| Ductility at 23° C. | % | 100 | 100 | 100 | 100 | 100 | 100 | 100 | 100 |
| INI at −30° C. | J/m | 610 | 719 | 711 | 595 | 716 | 786 | 730 | 808 |
| Ductility at −30° C. | % | 100 | 100 | 100 | 80 | 100 | 100 | 100 | 100 |
| Tensile modulus | MPa | 2189 | 2115 | 2013 | 2037 | 2052 | 2013 | 2180 | 2190 |
| Tensile strength at yield | MPa | 57.9 | 56.3 | 54.2 | 57 | 56.6 | 56.1 | 56.3 | 55.6 |
| Tensile strength at break | MPa | 64.7 | 60.4 | 42.4 | 57.7 | 60.7 | 61.1 | 60.4 | 59.2 |
| Tensile elongation at yield | % | 5.9 | 5.7 | 5.7 | 6 | 6 | 5.8 | 5.8 | 5.9 |
| Tensile elongation at break | % | 108.6 | 107.3 | 53.7 | 90.5 | 99.9 | 100.5 | 102.7 | 94.4 |
| Flexural modulus | MPa | 2160 | 2090 | 2030 | 2140 | 2130 | 2110 | 2110 | 2090 |
| Flexural strength at yield | MPa | 86.7 | 79.1 | 79.4 | 85.2 | 85.4 | 84.4 | 86.3 | 84.5 |
| Flexural strength at break | MPa | 84.9 | 83.7 | 77.8 | 83.6 | 83.7 | 82.7 | 84.5 | 82.8 |
| HDT | ° C. | 123 | 122 | 122 | 125 | 125 | 124 | 123 | 124 |
| MAI total energy at 23° C. | J | 64.6 | 57.9 | 52.9 | 71.8 | 72.3 | 71.7 | 60.9 | 69.5 |
| Ductility at 23° C. | % | 100 | 100 | 100 | 100 | 100 | 100 | 100 | 100 |
| MAI total energy at −30° C. | J | 69.9 | 71.8 | 64.9 | 73.2 | 73.8 | 77.6 | 71.9 | 74.3 |
| Ductility at −30° C. | % | 100 | 100 | 100 | 100 | 100 | 100 | 100 | 100 |
| UL94 at 1.5 mm (23° C., 48 h) | — | V0 | V0/V1 | V1 | NC | V2 | V2 | V0/V1 | V0 |
| UL94 at 1.5 mm (70° C., 168 h) | — | V0 | V0 | V0/V1 | V2/NC | V2 | V2 | V0 | V0 |

TABLE 3-continued

|  | Unit | CEx1 | CEx2 | Ex3' | CEx4 | CEx5 | CEx6 | CEx7 | CEx8 |
|---|---|---|---|---|---|---|---|---|---|
| Resistance Properties | | | | | | | | | |
| SANI-CLOTH AF3 | | 4/4 Crack | 2/4 Crack | 0/4 Crack | 4/4 Break | 4/4 Break | 4/4 Break | 4/4 Crack | 4/4 Crack |
| Tensile strength at yield | MPa | 19.3 | 55.8 | 53.7 | — | — | — | 19.1 | 31.2 |
| Tensile elongation at break | % | 2.2 | 38.8 | 74.9 | — | — | — | 1.6 | 2.1 |
| Tensile strength retention | % | 33 | 99 | 99 | — | — | — | 34 | 56 |
| Tensile elongation retention | % | 2 | 36 | 139 | — | — | — | 2 | 2 |
| SUPER SANI-CLOTH | | | | | 0/4 Crack | 0/4 Crack | 0/4 Crack | | |
| Tensile strength at yield | MPa | | | | 56.4 | 56.9 | 56.4 | | |
| Tensile elongation at break | % | | | | 99.5 | 116.3 | 106.3 | | |
| Tensile strength retention | % | | | | 99 | 101 | 101 | | |
| Tensile elongation retention | % | | | | 110 | 116 | 106 | | |
| SANI-CLOTH BLEACH | | | | | 0/4 Crack | 0/4 Crack | 0/4 Crack | | |
| Tensile strength at yield | MPa | | | | 56.7 | 56.6 | 55.9 | | |
| Tensile elongation at break | % | | | | 91.4 | 112.8 | 109.1 | | |
| Tensile strength retention | % | | | | 99 | 100 | 100 | | |
| Tensile elongation retention | % | | | | 101 | 113 | 109 | | |
| CAVICIDE | | | | | 0/4 Crack | 0/4 Crack | 0/4 Crack | | |
| Tensile strength at yield | MPa | | | | 57.2 | 57.1 | 55.7 | | |
| Tensile elongation at break | % | | | | 105.7 | 108.5 | 112.2 | | |
| Tensile strength retention | % | | | | 100 | 101 | 99 | | |
| Tensile elongation retention | % | | | | 117 | 109 | 112 | | |
| MIKROZID PAA WIPES | | | | | 0/4 Crack | 0/4 Crack | 0/4 Crack | | |
| Tensile strength at yield | MPa | | | | 56.9 | 56.8 | 56.1 | | |
| Tensile elongation at break | % | | | | 107.9 | 113.4 | 101.8 | | |
| Tensile strength retention | % | | | | 100 | 100 | 100 | | |
| Tensile elongation retention | % | | | | 119 | 114 | 101 | | |
| SANI-CLOTH HB | | | | | 4/4 Crack | 4/4 Crack | 1/4 Crack | | |
| Tensile strength at yield | MPa | | | | 38 | 29.4 | 55.6 | | |
| Tensile elongation at break | % | | | | 3.3 | 2.2 | 73.7 | | |
| Tensile strength retention | % | | | | 67 | 52 | 99 | | |
| Tensile elongation retention | % | | | | 4 | 2 | 73 | | |

TABLE 4

|  | Unit | Ex1 | CEx9 | Ex2 | Ex3 | Ex4 | Ex5 |
|---|---|---|---|---|---|---|---|
| Component | | | | | | | |
| PC1 | wt % | 45 | 45 | 45 | 45 | 46.65 | 45.3 |
| PC2 | wt % | 45 | 45 | 45 | 45 | 46.65 | 30 |
| BrPC | wt % | | | | | | 15 |
| SiPC60 | wt % | 4 | 4 | 4 | 4 | 4 | 4 |
| SiPC40-2 | | | | | | | |
| IM1 | wt % | 5 | | | | | |
| IM2 | wt % | | 5 | | | | |
| IM3 | wt % | | | 5 | | | |
| IM4 | wt % | | | | 5 | | 5 |
| IM5 | wt % | | | | | 2 | |
| IM6 | | | | | | | |
| KSS | wt % | 0.3 | 0.3 | 0.3 | 0.3 | | |
| TSAN | wt % | 0.3 | 0.3 | 0.3 | 0.3 | 0.3 | 0.3 |
| AO | wt % | 0.1 | 0.1 | 0.1 | 0.1 | 0.1 | 0.1 |
| PETS | wt % | 0.3 | 0.3 | 0.3 | 0.3 | 0.3 | 0.3 |
| $TiO_2$ | wt % | 1.811 | 1.811 | 1.811 | 1.811 | 1.811 | 1.811 |
| OB-1 | wt % | | | | | | |
| CB | wt % | 0.0009 | 0.0009 | 0.0009 | 0.0009 | 0.0009 | 0.0009 |
| SR52 | wt % | 0.0007 | 0.0007 | 0.0007 | 0.0007 | 0.0007 | 0.0007 |
| PY53 | wt % | 0.0217 | 0.0217 | 0.0217 | 0.0217 | 0.0217 | 0.0217 |
| Mechanical Properties | | | | | | | |
| MFR (300° C., 1.2 kg) | g/10 min | 9.1 | 18.3 | 9.7 | 9.9 | 11.3 | 9.6 |
| INI at 23° C. | J/m | 699 | 657 | 721 | 730 | 786 | 730 |
| Ductility at 23° C. | % | 100 | 100 | 100 | 100 | 100 | 100 |
| INI at −30° C. | J/m | 635 | 535 | 607 | 668 | 707 | 613 |
| Ductility at −30° C. | % | 100 | 80 | 100 | 100 | 100 | 100 |
| Tensile modulus | MPa | 2040 | 2020 | 2010 | 2030 | 2110 | 1980 |
| Tensile strength at yield | MPa | 51.7 | 49.9 | 49.7 | 50.7 | 53.5 | 52.2 |
| Tensile strength at break | MPa | 58.2 | 59.2 | 62.2 | 63.3 | 58.1 | 61.3 |

TABLE 4-continued

| | | | | | | | |
|---|---|---|---|---|---|---|---|
| Tensile elong. at yield | % | 5.6 | 5.3 | 5.4 | 5.4 | 5.6 | 5.8 |
| Tens. elong. at break | % | 108.1 | 113.2 | 124.1 | 127.2 | 104.2 | 108.5 |
| Flexural modulus | MPs | 1960 | 1950 | 1910 | 1940 | 2020 | 1990 |
| Flexural strength at yield | MPa | 78.8 | 76.6 | 76.2 | 78.3 | 80.9 | 78.6 |
| Flexural strength at break | MPa | 77.2 | 75.1 | 74.7 | 76.7 | 79.2 | 77 |
| HDT | °C. | 121 | 120 | 121 | 121 | 122 | 125 |
| MAI total energy at 23° C. | J | 51.8 | 48.8 | 53.1 | 57.6 | 57.9 | 56.2 |
| Ductility at 23° C. | % | 100 | 100 | 100 | 100 | 100 | 100 |
| MAI total Energy at −30° C. | J | 59.7 | 58.3 | 63.3 | 61.9 | 64.4 | 62.7 |
| Ductility at −30° C. | % | 100 | 100 | 100 | 100 | 100 | 100 |
| UL 94 at 1.5 mm (23° C., 48 h) | % | NC | NC | NC | NC | V0 | V0 |
| UL94 at 1.5 mm (70° C., 168 h) | | V1 | NC | NC | NC | V0/V1 | V0 |
| Resistance Properties | | | | | | | |
| SANI-CLOTH AF3 | | 0/4 Crack | 4/4 Crack | 1/4 Crack | 0/4 Crack | 1/4 Crack | 1/4 Crack |
| Tensile strength at yield | MPa | 50.4 | 10.5 | 49 | 49.7 | 52.4 | 44 |
| Tens. elong. at break | % | 116.5 | 1.1 | 94.5 | 118.7 | 80.3 | 76.5 |
| Tens. strength retention | % | 97 | 21 | 99 | 98 | 98 | 84 |
| Tens. elong. retention | % | 108 | 1 | 76 | 93 | 77 | 71 |
| CAVICIDE | | | | | | | |
| Tensile strength at yield | MPa | | | | | | |
| Tens. elong. at break | % | | | | | | |
| Tens. strength retention | % | | | | | | |
| Tensile elongation retention | % | | | | | | |
| SANI-CLOTH HB | | | | | | | |
| Tensile strength at yield | MPa | | | | | | |
| Tens. elongation at break | % | | | | | | |
| Tensile strength retention | % | | | | | | |
| Tens. elong. retention | % | | | | | | |

| | Ex6 | Ex7 | Ex8 | Ex9 | Ex10 | Ex11 |
|---|---|---|---|---|---|---|
| Component | | | | | | |
| PC1 | 45.3 | 45.3 | 46.15 | 45.15 | 45.15 | 42.15 |
| PC2 | 35 | 35 | 46.15 | 45.15 | 45.15 | 30.15 |
| BrPC | 10 | 10 | | | | |
| SiPC60 | 4 | 4 | 4 | 4 | 4 | |
| SiPC40-2 | | | | | | 10 |
| IM1 | | | | | | |
| IM2 | | | | | | |
| IM3 | | | | | | |
| IM4 | 5 | | | | | 5 |
| IM5 | | | 3 | 5 | 2 | |
| IM6 | | 5 | | | 3 | |
| KSS | | | | | | |
| TSAN | 0.3 | 0.3 | 0.3 | 0.3 | 0.3 | 0.3 |
| AO | 0.1 | 0.1 | 0.1 | 0.1 | 0.1 | 0.1 |
| PETS | 0.3 | 0.3 | 0.3 | 0.3 | 0.3 | 0.3 |
| $TiO_2$ | 1.811 | 1.811 | 1.811 | 1.811 | 1.811 | 1.811 |
| OB-1 | | | | | | |
| CB | 0.0009 | 0.0009 | 0.0009 | 0.0009 | 0.0009 | 0.0009 |
| SR52 | 0.0007 | 0.0007 | 0.0007 | 0.0007 | 0.0007 | 0.0007 |
| PY53 | 0.0217 | 0.0217 | 0.0217 | 0.0217 | 0.0217 | 0.0217 |
| Mechanical Properties | | | | | | |
| MFR (300° C., 1.2 kg) | 9.2 | 8.5 | 10.5 | 8.5 | 8.7 | 5.7 |
| INI at 23° C. | 701 | 7.38 | 795 | 757 | 765 | 642 |
| Ductility at 23° C. | 100 | 100 | 100 | 100 | 100 | 100 |
| INI at −30° C. | 631 | 628 | 704 | 667 | 682 | 551 |
| Ductility at −30° C. | 100 | 100 | 100 | 100 | 100 | 100 |
| Tensile modulus | 1960 | 1930 | 2010 | 1930 | 1930 | 1850 |
| Tensile strength at yield | 51.8 | 51.3 | 51.9 | 49.9 | 50.4 | 48.8 |
| Tensile strength at break | 59.1 | 51.2 | 54.2 | 56.2 | 59 | 58.8 |
| Tensile elong. at yield | 5.7 | 5.8 | 5.6 | 5.6 | 5.6 | 5.6 |
| Tens. elong. at break | 105.1 | 87.9 | 97.1 | 107.3 | 111.9 | 98 |
| Flexural modulus | 1970 | 1950 | 2010 | 1950 | 1950 | 1850 |
| Flexural strength at yield | 78 | 76.3 | 78.8 | 74.4 | 75.9 | 72.6 |
| Flexural strength at break | 76.4 | 74.8 | 76.5 | 72.9 | 74.4 | 71.1 |
| HDT | 125 | 125 | 125 | 122 | 123 | 124 |
| MAI total energy at 23° C. | 53.6 | 53.4 | 55.3 | 51.6 | 48 | |
| Ductility at 23° C. | 100 | 100 | 100 | 100 | 100 | |
| MAI total Energy at −30° C. | 61.1 | 64.7 | 60.6 | 59.1 | 58.5 | |
| Ductility at −30° C. | 100 | 100 | 100 | 100 | 100 | |
| UL 94 at 1.5 mm (23° C., 48 h) | V0 | V0 | V0 | V0 | NC | V1 |
| UL94 at 1.5 mm (70° C., 168 h) | V0 | V0 | V0/V1 | V0/V1 | V1 | V0 |

TABLE 4-continued

| Resistance Properties | | | | | | |
|---|---|---|---|---|---|---|
| SANI-CLOTH AF3 | 0/4 Crack | 0/4 Crack | 0/4 Crack | 0/4 Crack | 0/4 Crack | 0/4 Crack |
| Tensile strength at yield | 52.2 | 52 | 52.8 | 49.9 | 50.8 | 48.8 |
| Tens. elong. at break | 101.5 | 91.2 | 106 | 109 | 118.1 | 97.5 |
| Tens. strength retention | 101 | 101 | 102 | 100 | 101 | 100 |
| Tens. elong. retention | 97 | 104 | 109 | 102 | 106 | 100 |
| CAVICIDE | 0/4 Crack | 0/4 Crack | 0/4 Crack | 0/4 Crack | 0/4 Crack | |
| Tensile strength at yield | 51.5 | 51.1 | 52.3 | 49.8 | 50.2 | |
| Tens. elong. at break | 107.6 | 99.5 | 97 | 106.3 | 108 | |
| Tens. strength retention | 99 | 100 | 101 | 100 | 100 | |
| Tensile elongation retention | 102 | 113 | 100 | 99 | 97 | |
| SANI-CLOTH HB | 0/4 Crack | 0/4 Crack | 0/4 Crack | 0/4 Crack | 0/4 Crack | 0/4 Crack |
| Tensile strength at yield | 51.8 | 51.5 | 52.3 | 50.2 | 50.4 | 47.9 |
| Tens. elongation at break | 107.6 | 99.5 | 97 | 106.3 | 108 | 89.6 |
| Tensile strength retention | 100 | 100 | 101 | 101 | 100 | 98 |
| Tens. elong. retention | 102 | 113 | 100 | 99 | 97 | 92 |

NC = not classified (no rating in the UL94 vertical burn test)

The data shows that when the SiPC60 loading is 3 to 4% (CEx1, CEx2 CEx4 to CEx8), the samples do not pass ESCR test against strong sanitizer SANI-CLOTH AF3 and SANI-CLOTH HB. The loading of SiPC6 needs to be as high as 7% (Ex3') to pass ESCR test against strong sanitizer SANI-CLOTH AF3. However, it is noted that when the SiPC60 loading is so high, there can be black streaks on the surface of white molded parts. These high levels may accordingly be useful in applications where appearance is less important.

Surprisingly, adding a small amount of an impact modifier such as MBS or silicone-based impact modifier greatly improves the chemical resistance of the BPA polycarbonates and SiPC60 blends. At about 4 wt % siloxane loading level, the samples can pass ESCR test against SANI-CLOTH AF3. The results are surprising because it is not expected that a small amount of certain impact modifiers can be effective to improve the chemical resistance of a polycarbonate composition. In addition, the results are surprising because not all the known impact modifiers can improve the chemical resistance of BPA-PC and SiPC60 blends. CEx9 shows that when 5 wt % acrylate impact modifier is added, a sample of the composition only has a tensile strength retention of 21% and a tensile elongation retention of 1% after exposure of an ASTM tensile bar for seven days to SANI-CLOTH AF3 at a temperature of 23° C. under 1% strain compared to a non-exposed reference tested at the same temperature. In contrast, when MBS or a silicone-based impact modifier is used, at the same impact modifier loading level, compositions achieve a tensile strength retention of greater than 95% and a tensile elongation retention of greater than 75% after exposure of an ASTM tensile bar for seven days to SANI-CLOTH AF3 at a temperature of 23° C. under 1% strain compared to a non-exposed reference tested at the same temperature.

Meanwhile, the data also shows that with the addition of MBS or a silicone-based impact modifier, most mechanical properties are maintained. Further, when an acrylic-silicone core-shell flame retardant/impact modifier Kaneka ACE MR-01 is used, the compositions also maintain the UL94 rating, as indicated by Ex4, Ex8, and Ex9. When other impact modifiers are used, a flame retardant such as a brominated polycarbonate can be added for better flame retardant performance, as indicated by Ex5 to Ex7.

The data also shows the effect of using SiPC2 (40 wt % siloxane) at higher loading (10 wt %, Ex1).

The additional following examples were prepared and tested using the materials shown in Table 1. The compositions were prepared by pre-blending all constituents in a dry-blend and tumble mixed for 15 minutes. The pre-blend was fed directly to a co-rotation twin screw extruder under the conditions shown in Table 2 above. The extrudate was pelletized and dried in a dehumidifying dryer at about 120° C. for about 3 hours. To make test specimens, the dried pellets were injection molded in a FANUC S-2000i molding machine to form appropriate test samples under the conditions shown in Table 2 above.

Samples were tested as described above except that ESCR tests followed a SABIC internal method and used ASTM tensile bars under 1% strain for five days at room temperature (23° C.) with chemical (BANABA BOAT sunscreen) applied on the surface.

Exemplary compositions (Ex3a to Ex12a), along with control or comparative compositions (CEx1a and CEx2a), and the impact, flow, heat deflection temperature, flame retardance, and chemical resistance of the samples are shown in Table 5.

TABLE 5

| Component | Unit | CEx1a | CEx2a | Ex3a | Ex4a | Ex5a | Ex6a |
|---|---|---|---|---|---|---|---|
| PC1 | wt % | 49.35 | 38.3 | 42 | 45.7 | 48.85 | 48.35 |
| PC2 | wt % | 49.35 | 38.23 | 41.92 | 45.61 | 48.85 | 48.35 |
| SiPC20 | wt % | | 22.18 | 11.09 | | | |
| SiPC60 | wt % | | | 3.7 | 7.4 | 1 | 2 |
| SiPC40-2 | | | | | | | |
| SiPC40-1 | | | | | | | |
| KSS | wt % | 0.3 | 0.3 | 0.3 | 0.3 | 0.3 | 0.3 |
| TSAN | wt % | 0.3 | 0.3 | 0.3 | 0.3 | 0.3 | 0.3 |
| UV | wt % | 0.3 | 0.3 | 0.3 | 0.3 | 0.3 | 0.3 |
| AO | wt % | 0.1 | 0.09 | 0.09 | 0.09 | 0.1 | 0.1 |

TABLE 5-continued

| | | | | | | | |
|---|---|---|---|---|---|---|---|
| PETS | wt % | 0.3 | 0.3 | 0.3 | 0.3 | 0.3 | 0.3 |
| TiO₂ | wt % | 2.5 | 2.5 | 2.5 | 2.5 | 2.5 | 2.5 |
| OB-1 | wt % | 0.009 | 0.009 | 0.009 | 0.009 | 0.009 | 0.009 |
| Siloxane % | wt % | 0.00 | 4.49 | 4.50 | 4.50 | 0.61 | 1.22 |
| MFR (300° C., 1.2 kg) | g/10 min | 14.7 | 9.3 | 10.7 | 12.8 | 14.8 | 14.7 |
| INI at 23° C. | J/m | 826 | 851 | 842 | 802 | 814 | 822 |
| Ductility at 23° C. | % | 100 | 100 | 100 | 100 | 100 | 100 |
| INI at −30° C. | J/m | 120 | 714 | 732 | 749 | 181 | 243 |
| Ductility at −30° C. | % | 0 | 100 | 100 | 100 | 0 | 0 |
| Tensile modulus | MPa | 2330 | 2100 | 2100 | 2080 | 2250 | 2300 |
| Tensile strength at yield | MPa | 60.9 | 55.7 | 56 | 54.6 | 59.4 | 57.9 |
| Tensile strength at break | MPa | 62.9 | 53 | 59.9 | 52 | 66.2 | 61.3 |
| Tensile elongation at yield | % | 6.1 | 5.7 | 5.7 | 5.8 | 6 | 5.8 |
| Tensile elongation at break | % | 90.9 | 75.5 | 100.7 | 88.2 | 110.1 | 103 |
| Flexural modulus | MPa | 2270 | 2020 | 2010 | 2040 | 2210 | 2180 |
| Flexural strength at yield | MPa | 92.5 | 78.8 | 79.2 | 79.3 | 90.3 | 89.4 |
| Flex, strength at break | MPa | 90.7 | 77.2 | 77.7 | 77.7 | 88.5 | 87.7 |
| HDT | ° C. | 124 | 122 | 122 | 122 | 123 | 123 |
| MAI at 23° C. | J | 72.3 | 63.2 | 59 | 52.7 | 74.9 | 71.1 |
| Ductility at 23° C. | % | 100 | 100 | 100 | 100 | 100 | 100 |
| MAI at −30° C. | J | 68.1 | 60.4 | 67.2 | 66 | 70.5 | 69.4 |
| Ductility at −30° C. | % | 100 | 100 | 100 | 100 | 100 | 100 |
| UL94 (1.5 mm, 23° C., 48 h) | — | V0/V1 | V0/V1 | V0 | V1 | V0/V1 | V1 |
| UL94 (1.5 mm, 70° C., 168 h) | — | V0 | V0 | V0 | V0/V1 | V0 | V1 |
| ESCR (1 day) | | 4/4 crack | 3/4 crack | 1/4 crack | 0/4 crack | 1/4 crack | 0/4 crack |
| ESCR (4 day) | | 4/4 crack | 4/4 crack | 3/4 crack | 0/4 crack | 4/4 crack | 0/4 crack |
| ESCR (5 day) | — | 4/4 crack | 4/4 crack | 4/4 crack | 0/4 crack | 4/4 crack | 0/4 crack |

| Component | Ex7a | Ex8a | Ex9a | Ex10a | Ex11a | Ex12a |
|---|---|---|---|---|---|---|
| PC1 | 47.85 | 46.85 | 45.85 | 44.35 | 44.1 | 44.1 |
| PC2 | 47.85 | 46.85 | 45.85 | 44.35 | 44.6 | 44.6 |
| SiPC20 | | | | | | |
| SiPC60 | 3 | 5 | 7 | 10 | | |
| SiPC40-2 | | | | | 10 | |
| SiPC40-1 | | | | | | 10 |
| KSS | 0.3 | 0.3 | 0.3 | 0.3 | 0.3 | 0.3 |
| TSAN | 0.3 | 0.3 | 0.3 | 0.3 | 0.3 | 0.3 |
| UV | 0.3 | 0.3 | 0.3 | 0.3 | 0.3 | 0.3 |
| AO | 0.1 | 0.1 | 0.1 | 0.1 | 0.1 | 0.1 |
| PETS | 0.3 | 0.3 | 0.3 | 0.3 | 0.3 | 0.3 |
| TiO₂ | 2.5 | 2.5 | 2.5 | 2.5 | 3 | 3 |
| OB-1 | 0.009 | 0.009 | 0.009 | 0.009 | 0.03 | 0.03 |
| Siloxane % | 1.82 | 3.04 | 4.26 | 6.08 | 3.88 | 3.88 |
| MFR (300° C., 1.2 kg) | 13.6 | 13.7 | 14.3 | 13.8 | 8.2 | 9.6 |
| INI at 23° C. | 847 | 828 | 825 | 789 | 830 | 840 |
| Ductility at 23° C. | 100 | 100 | 100 | 100 | 100 | 100 |
| INI at −30° C. | 610 | 719 | 711 | 638 | 735 | 744 |
| Ductility at −30° C. | 100 | 100 | 100 | 100 | 100 | 100 |
| Tensile modulus | 2189 | 2115 | 2013 | 2050 | 2090 | 2100 |
| Tensile strength at yield | 57.9 | 56.3 | 54.2 | 52.4 | 55.5 | 56.5 |
| Tensile strength at break | 64.7 | 60.4 | 42.4 | 33.6 | 56.2 | 61.1 |
| Tensile elongation at yield | 5.9 | 5.7 | 5.7 | 5.7 | 5.8 | 5.8 |
| Tensile elongation at break | 108.6 | 107.3 | 53.7 | 34.3 | 83.2 | 101.5 |
| Flexural modulus | 2160 | 2090 | 20.30 | 1940 | 2150 | 2150 |
| Flexural strength at yield | 86.7 | 79.1 | 79.4 | 71.7 | 86.2 | 87.6 |
| Flex, strength at break | 84.9 | 83.7 | 77.8 | 70.3 | 84.5 | 85.9 |
| HDT | 123 | 122 | 122 | 122 | 122 | 122 |
| MAI at 23° C. | 64.6 | 57.9 | 52.9 | — | — | — |
| Ductility at 23° C. | 100 | 100 | 100 | — | — | — |
| MAI at −30° C. | 69.9 | 71.8 | 64.9 | — | — | — |
| Ductility at −30° C. | 100 | 100 | 100 | — | — | — |
| UL94 (1.5 mm, 23° C., 48 h) | V0 | V0/V1 | V1 | V1 | V0 | V0 |
| UL94 (1.5 mm, 70° C., 168 h) | V0 | V0 | V0/V1 | V1 | V0 | V0 |
| ESCR (1 day) | 0/4 crack | 0/4 crack | 0/4 crack | 0/4 crack | 0/4 crack | 0/4 crack |
| ESCR (4 day) | 0/4 crack | 0/4 crack | 0/4 crack | 0/4 crack | 0/4 crack | 0/4 crack |
| ESCR (5 day) | 0/4 crack | 0/4 crack | 0/4 crack | 0/4 crack | 0/4 crack | 0/4 crack |

CEx1a is a composition that contains only polycarbonate homopolymers without any poly(carbonate-siloxane). CEx1a has poor low temperature impact (INI at −30° C.) and poor chemical resistance (ESCR) with an INI at −30° C. of 120 J/m and all four bars breaking after exposing to BANANA BOAT sunscreen at room temperature for just one day.

Ex2a to Ex4a illustrate the effects of replacing a poly (carbonate-siloxane) having 20 wt % of siloxane with a poly(carbonate-siloxane) having 60 wt % of siloxane on impact, flow, heat deflection temperature, flame retardance, and chemical resistance.

Ex1a to Ex3a show that at the same total siloxane loading level, when a poly(carbonate-siloxane) with 20 wt % of siloxane is partially or completely replaced with a poly (carbonate-siloxane) with 60 wt % siloxane, most mechanical properties and flame retardance properties are maintained or improved, and meanwhile, the chemical resistance is significantly improved.

CEx2a contains 22.18 wt % SiPC-20 with 20 wt % of siloxane. The total siloxane loading of CEx2a in polycarbonate homopolymer and poly(carbonate-siloxane) is 4.5 wt %. After exposure to BANANA BOAT sunscreen at room temperature for only one day, three out of four bars of CEx2a break. In contrast, at the same total siloxane loading level of 4.5%, when SiPC20 with 20 wt % siloxane is completely replaced with SiPC with 60 wt % of siloxane (Ex4a), none of the four bars crack after exposing to BANANA BOAT sunscreen at room temperature for five days. When SiPC20 with 20 wt % of siloxane is partially replaced with SiPC with 60 wt % siloxane (Ex3a), the chemical resistance also improves at the same total siloxane level of 4.5 wt %.

Ex5a to Ex10a show the effect of different loading of SiPC60 on the chemical resistance and other properties. Even with only 1 wt % of SiPC60 (Ex5a), only one out of four bars breaks, which is much better than the performance of CEx1a and CEx2a. If the loading of SiPC60 is 2 wt % or higher, (Ex6a to Ex10a), none of the four bars crack after 5 days of exposure to BANANA BOAT sunscreen.

Ex11a and Ex12a show the effect of using poly(carbonate-siloxane) with different levels of siloxane (40 wt %) in the compositions.

The results demonstrate that poly(carbonate-siloxane) compositions can be formulated to have excellent balance of impact, flow, and flame retardant properties, in combination with excellent chemical resistance.

Further included in this disclosure are the following specific Aspects, which do not necessarily limit the claims.

Aspect 1. A polycarbonate composition comprising: 10 to 95 wt % of one or more bisphenol A polycarbonate homopolymers based on the total weight of the polycarbonate composition; a poly(carbonate-siloxane) having a siloxane content of 30 to 70 wt %, preferably 35 to 65 wt %, each based on the total weight of the poly(carbonate-siloxane), optionally wherein the poly(carbonate-siloxane) is a poly (carbonate-siloxane) elastomer, in an amount effective to provide a total siloxane content of 0.5 to 10 wt % based on the total weight of the polycarbonate composition; and an impact modifier comprising a silicone-based impact modifier different from the poly(carbonate-siloxane), a methyl methacrylate-butadiene-styrene copolymer; or a combination thereof; wherein a sample of the composition has a tensile strength retention of 80% and higher after exposure of an ASTM tensile bar for 168 hours to SANI-CLOTH AF3 at a temperature of 23° C. under 0.5% or 1% strain compared to a non-exposed reference tested at the same temperature, and a tensile elongation retention of 65% and higher after exposure of an ASTM tensile bar for 168 hours to SANI-CLOTH AF3 at a temperature of 23° C. under 0.5% or 1% strain compared to a non-exposed reference tested at the same temperature.

Aspect 2. The composition of Aspect 1, wherein the silicone-based impact modifier comprises a silicone graft copolymer having a core comprising a polydiorganosiloxane and a vinyl-based monomer graft copolymerized with the core to form a shell.

Aspect 3. The composition of Aspect 1, wherein the silicone-based impact modifier comprises a silicone-acrylic rubber.

Aspect 4. The composition of Aspect 1, wherein the impact modifier comprises methyl methacrylate core shell copolymer with butyl acrylate rubber and dimethylsiloxane as the core.

Aspect 5. The composition of any one or more of Aspects 1 to 4, wherein the impact modifier is present in an amount of 1 to 10 wt %, based on the total weight of the composition.

Aspect 6. The composition of any one or more of Aspects 1 to 5, wherein the poly(carbonate-siloxane) has a siloxane content of 30 to 60 wt %, based on the total weight of the poly(carbonate-siloxane).

Aspect 7. The composition of any one or more of Aspects 1 to 6, wherein the poly(carbonate-siloxane) is present in an amount of 1 to 20 wt %, or 2 to 15 wt %, based on the total weight of the composition.

Aspect 8. The composition of any one or more of Aspects 1 to 7, wherein the poly(carbonate-siloxane) comprises bisphenol A carbonate units and siloxane units, preferably siloxane units of formula (5) or formula (6) wherein each R is independently a $C_{1-13}$ monovalent organic group, each Ar is independently an arylene group, each $R^5$ is independently a divalent $C_{1-30}$ hydrocarbylene group, and E has an average value of 2 to 1,000, or 2 to 500, 2 to 200, or 2 to 125, 5 to 80, or 10 to 70; more preferably siloxane units of the formula (7) wherein each R is independently a $C_{1-3}$ alkyl, $C_{1-3}$ alkoxy, $C_{3-6}$ cycloalkyl, $C_{3-6}$ cycloalkoxy, $C_{6-14}$ aryl, $C_{6-10}$ aryloxy, $C_7$ arylalkylene, $C_7$ arylalkylenoxy, $C_7$ alkylarylene, or $C_7$ alkylarylenoxy; M is bromo or chloro, a $C_{1-3}$ alkyl, $C_{1-3}$ alkoxy, phenyl, chlorophenyl, or tolyl; $R^6$ is a dimethylene, trimethylene, or tetramethylene; n is independently 0 to 4; and E has an average value of 10 to 100, more preferably siloxane units of formulas (5a), (5b), (7a), (7b), (7c), or a combination thereof, wherein E has an average value of 10 to 100, most preferably siloxane units of formula (7c), wherein E has an average value of 20 to 80, or 30 to 70.

Aspect 9. The composition of any one or more of Aspects 1 to 8, comprising a first bisphenol A polycarbonate homopolymer having a weight average molecular weight of 15,000 to 25,000 Da; and a second bisphenol A polycarbonate homopolymer having a weight average molecular weight of 26,000 to 40,000 Da, each determined by gel permeation chromatography, using a crosslinked styrene-divinylbenzene column and calibrated to bisphenol A polycarbonate standards.

Aspect 10. The composition of Aspect 9, wherein the weight ratio of the first bisphenol A polycarbonate homopolymer relative to the second bisphenol A polycarbonate homopolymer is 1:3 to 3:1.

Aspect 11. The composition of any one or more of Aspects 1 to 10, comprising, based on the total weight of the composition, 70 to 92 wt % of the one or more bisphenol A polycarbonate homopolymers; 1 to 15 wt % of the poly (carbonate-siloxane), preferably a poly(carbonate-siloxane)

comprising siloxane units of formula (7c) wherein E has an average value of 20 to 80, or 30 to 70; and 1 to 10 wt % of the impact modifier.

Aspect 12. The composition of any one or more of Aspects 1 to 11, wherein the composition further comprises a flame retardant.

Aspect 13. The composition of Aspect 12, wherein the flame retardant comprises an alkali metal salt of a sulfonate, an inorganic acid complex salt, phosphate, phosphazene, brominated flame retardant or a combination thereof.

Aspect 14. The composition of Aspect 12, wherein the flame retardant further comprises a brominated polycarbonate.

Aspect 15. The composition of any one or more of Aspects 1 to 14, further comprising up to 10 wt % of titanium dioxide, carbon black, an inorganic pigment, an organic pigment, a dye, or a combination thereof, based on the total weight of the composition.

Aspect 16. The composition of any one or more of Aspects 1 to 15 further comprising no more than 5 wt % based on the weight of the composition of an anti-drip agent, a processing aid, a heat stabilizer, an antioxidant, an ultra violet light absorber, or a combination thereof.

Aspect 17. The composition of any one or more of Aspects 1 to 16, wherein the composition has one or more of the following properties: a UL-94 flammability rating of V1 or better as measured on a flame bar having a thickness of 1.5 mm; a melt flow rate higher than 5 g/10 min determined in accordance with ASTM D1238 under a load of 1.2 kg at 300° C. with a dwelling time of 300 seconds; an Izod notched impact energy of at least 550 J/m measured at −30° C. on a sample of 3.2 mm thickness according to ASTM D256-10; or a multi-axial impact of greater than 50 J measured at −30° C. and 3.3 m/s on a sample of 3.2 mm thickness according to ASTM D3763.

Aspect 18. An article selected from a molded article, a thermoformed article, an extruded film, an extruded sheet, a honeycomb structure, one or more layers of a multi-layer article, a substrate for a coated article, and a substrate for a metallized article made from the composition of any one of Aspects 1 to 17.

Aspect 19. The article of Aspect 18, wherein the article is a component of a healthcare product, or a component of a consumer electronic device.

Aspect 20. A method of manufacture of an article, comprising molding, extruding, casting, or shaping the composition of any one of Aspects 1 to 17 to form the article.

Other aspects are as follows.

Aspect 1a. A polycarbonate composition comprising: 10 to 99 wt % of one or more polycarbonates, based on the total weight of the polycarbonate composition; and a poly(carbonate-siloxane) having a siloxane content of 30 to 70 wt %, based on the total weight of the poly(carbonate-siloxane), optionally wherein the poly(carbonate-siloxane) is a poly (carbonate-siloxane) elastomer, in an amount effective to provide a total siloxane content of 0.5 to 10 wt % based on the total weight of the polycarbonate composition; wherein the polycarbonate composition has improved resistance to sunscreen as compared to a reference composition having the same total siloxane content, but provided only by a reference poly(carbonate-siloxane) having a siloxane content of 20 wt % based on the total weight of the reference poly(carbonate-siloxane).

Aspect 2a. The composition of Aspect 1a, wherein the poly(carbonate-siloxane) has a siloxane content of 35 to 65 wt %, each based on the total weight of the poly(carbonate-siloxane).

Aspect 3a. The composition of any one or more of Aspects 1a to 2a, wherein the poly(carbonate-siloxane) is present in an amount of 1 to 20 wt %, preferably 2.5 to 15 wt %, based on the total weight of the composition.

Aspect 4a. The composition of any one or more of Aspects 1a to 3a, comprising, based on the total weight of the composition, 85 to 98 wt % of one or more bisphenol homopolycarbonates; 2 to 10 wt % of the poly(carbonate-siloxane); and 0 to 10 wt % of a flame retardant, provided that the total weight of the composition does not exceed 100 wt %.

Aspect 5a. The composition of any one or more of Aspects 1a to 3a, comprising, based on the total weight of the composition, 87 to 97 wt % of the one or more bisphenol A homopolycarbonates; 2 to 10 wt % of the poly(carbonate-siloxane); and 0.05 to 1 wt % of a flame retardant, provided that the total weight of the composition does not exceed 100 wt %, wherein the composition has a notched Izod impact of greater than 500 J/m as measured according to ASTM D256-10 at −30° C. on a sample of 3.2 mm thickness; and a ductility of greater than 80% as measured according to ASTM D256-10 at −30° C. on a sample of 3.2 mm thickness.

Aspect 6a. The composition of any one or more of Aspects 1a to 5a, comprising a first bisphenol homopolycarbonate having a weight average molecular weight of 15,000 to 25,000 Da; and a second bisphenol homopolycarbonate having a weight average molecular weight of 26,000 to 40,000 Da, each determined by gel permeation chromatography, using a crosslinked styrene-divinylbenzene column and calibrated to bisphenol A polycarbonate standards.

Aspect 7a. The composition of Aspect 6a, wherein the weight ratio of the first polycarbonate relative to the second bisphenol homopolycarbonate is 1:3 to 3:1.

Aspect 8a. The composition of any one or more of Aspect 1a to 7a, wherein the polycarbonate is a bisphenol homopolycarbonate comprising units of formula (1a) wherein $R^a$ and $R^b$ are each independently $C_{1-12}$ alkyl, $C_{1-12}$ alkenyl, $C_{3-8}$ cycloalkyl, or $C_{1-12}$ alkoxy, p and q are each independently 0 to 4, and $X^a$ is a single bond, —O—, —S—, —S(O)—, —S(O)$_2$—, —C(O)—, a $C_{1-11}$ alkylidene of formula —C(R')($R^d$)— wherein $R^c$ and $R^d$ are each independently hydrogen or $C_{1-10}$ alkyl, or a group of the formula —C(=$R^e$)— wherein $R^e$ is a divalent $C_{1-10}$ hydrocarbon group; preferably wherein $R^a$ and $R^b$ are each independently $C_{1-3}$ alkyl or $C_{1-3}$ alkoxy, p and q are each independently 0 to 1, and $X^a$ is a single bond, —O—, —S(O)—, —S(O)$_2$—, —C(O)—, a $C_{1-11}$ alkylidene of formula —C(R')($R^d$)— wherein $R^c$ and $R^d$ are each independently hydrogen or $C_{1-10}$ alkyl, more preferably wherein the bisphenol is bisphenol A.

Aspect 9a. The composition of any one or more of Aspects 1a to 8a, wherein the poly(carbonate-siloxane) comprises siloxane units of formula (5) or formula (6) wherein each R is independently a $C_{1-13}$ monovalent organic group, each Ar is independently an arylene group, each $R^5$ is independently a divalent $C_{1-30}$ hydrocarbylene group, and E has an average value of 2 to 1,000, or 2 to 500, 2 to 200, or 2 to 125, 5 to 80, or 10 to 70; preferably siloxane units of formula (7) wherein each R is independently a $C_{1-3}$ alkyl, $C_{1-3}$ alkoxy, $C_{3-6}$ cycloalkyl, $C_{3-6}$ cycloalkoxy, $C_{6-14}$ aryl, $C_{6-10}$ aryloxy, $C_7$ arylalkylene, $C_7$ arylalkylenoxy, $C_7$ alkylarylene, or $C_7$ alkylarylenoxy; M is bromo or chloro, a $C_{1-3}$ alkyl, $C_1$-$C_{33}$ alkoxy, phenyl, chlorophenyl, or tolyl; $R^6$ is a dimethylene, trimethylene, or tetramethylene; n is independently 0 to 4; and E has an average value of 10 to 100.

Aspect 10a. The composition of any one or more of Aspects 1a to 9a, wherein the poly(carbonate-siloxane) comprises siloxane units of formula (5a), (5b), (7a), (7b), (7c), or a combination thereof, wherein E has an average value of 10 to 100; preferably siloxane units of formula (7a) wherein E has an average value of 20 to 80, or 30 to 70.

Aspect 11a. The composition of any one or more of Aspects 1a to 10a, further comprising a second poly(carbonate-siloxane) with a siloxane content of 5 to 25 wt % based on the total weight of the second poly(carbonate-siloxane), wherein the polycarbonate composition has a total siloxane content of 0.5 to 10 wt % based on the total weight of the composition.

Aspect 12a. The composition of any one or more of Aspects 1a to 11a, wherein the poly(carbonate-siloxane) comprises bisphenol A carbonate units and polydimethyl siloxane units.

Aspect 13a. The composition of any one or more of Aspects 1a to 12a, further comprising a flame retardant that comprises an alkali metal salt of sulfonate, an inorganic acid complex salt, a phosphate, a phosphazene, a brominated flame retardant, or a combination thereof.

Aspect 14a. The composition of Aspect 13a, wherein the flame retardant is potassium diphenylsulfone sulfonate, sodium toluene sulfonate, potassium perfluorobutane sulphonate, bisphenol A bis(diphenyl phosphate), resorcinol bis(diphenyl phosphate), poly(bis(phenoxy)phosphazene, a brominated polycarbonate, or a combination thereof.

Aspect 15a. The composition of any one or more of Aspects 1a to 14a, further comprising up to 10 wt % of titanium dioxide, carbon black, an inorganic pigment, an organic pigment, a dye, or a combination thereof, based on the total weight of the composition.

Aspect 16a. The composition of any one or more of Aspects 1a to 15a, further comprising no more than 5 wt % based on the weight of the composition of an anti-drip agent, a processing aid, a heat stabilizer, an antioxidant, an ultra violet light absorber, or a combination thereof.

Aspect 17a. The composition of any one or more of Aspects 1a to 16a, wherein the composition is free of a poly(carbonate-siloxane) with a siloxane content of equal to or less than 40 wt % based on the total weight of the poly(carbonate-siloxane).

Aspect 18a. The composition of any one or more of Aspects 1a to 17a, wherein the polycarbonate composition exhibits at least one of: a UL-94 flammability rating of V1 or better as measured on a flame bar having a thickness of 1.5 mm; a melt flow rate higher than 5 g/10 min determined in accordance with ASTM D1238 under a load of 1.2 kg at 300° C. with a dwelling time of 300 seconds; an Izod notched impact energy of at least 150 J/m measured at −30° C. on a sample of 3.2 mm thickness according to ASTM D256-10; or a multi-axial impact of greater than 50 J measured at −30° C. and 3.3 m/s on a sample of 3.2 mm thickness according to ASTM D3763.

Aspect 19a. An article that is a molded article, a thermoformed article, an extruded film, an extruded sheet, a honeycomb structure, one or more layers of a multi-layer article, a substrate for a coated article, and a substrate for a metallized article made from the composition of any one of Aspects 1a to 18a.

Aspect 20a. The article of Aspect 19 a, wherein the article is a component of a consumer electronic device, preferably a gaming console, a gaming controller, a portable gaming device, a cellular telephone, a television, a personal computer, a tablet computer, a laptop computer, a personal digital assistant, a portable media player, a digital camera, a portable music player, an appliance, a power tool, a robot, a toy, a greeting card, a home entertainment system, a loudspeaker, or a soundbar, or the article is an electronic housing for an adapter, a cell phone, a smart phone, a global positioning (GPS) device, a laptop computer, a tablet computer, an e-reader, a copier, or a solar apparatus, or the article is an electrical junction box, an electrical connector, an electrical vehicle charger, an outdoor electrical enclosure, a smart meter enclosure, a smart grid power node, a photovoltaic frame, a miniature circuit breaker, or the article is an automotive, scooter, or motorcycle exterior or interior component such as a panel, a quarter panel, a rocker panel, a trim, fenders, battery cover, a door, a deck-lid, a trunk lid, a hood, a bonnet, a roof, a bumper, a fascia, grille, a mirror housing, a pillar appliqué, a cladding, body side molding, a wheel cover, a hubcap, a door handle, a spoiler, a window frame, a headlamp bezel, a headlamp, a tail lamp, a tail lamp housing, a tail lamp bezel, a license plate enclosure, a roof rack, or a and running board.

Still other aspects are as follows.

Aspect 1b. A polycarbonate composition comprising: 10 to 99 wt % of one or more bisphenol A polycarbonate homopolymers based on the total weight of the polycarbonate composition; a poly(carbonate-siloxane) having a siloxane content of 30 to 70 wt %, based on the total weight of the poly(carbonate-siloxane), optionally wherein the poly (carbonate-siloxane) is a poly(carbonate-siloxane) elastomer, in an amount effective to provide a total siloxane content of 0.5 to 10 wt % based on the total weight of the polycarbonate composition; and wherein a sample of the composition has improved chemical resistance as compared to a reference composition, e.g., a reference composition having the same siloxane content, but wherein the poly (carbonate-siloxane) has a siloxane content of 25 wt % or less.

Aspect 2b. The composition of aspect 1b, wherein an ASTM tensile bar comprising the composition has a tensile strength retention of 80% and higher after exposure of the bar for 168 hours to SANI-CLOTH AF3 at a temperature of 23° C. under 0.5% or 1% strain compared to a non-exposed reference tested at the same temperature, and a tensile elongation retention of 65% and higher after exposure of the bar for 168 hours to SANI-CLOTH AF3 at a temperature of 23° C. under 0.5% or 1% strain compared to a non-exposed reference tested at the same temperature.

Aspect 3b. The composition of aspect 1b or 2b, further comprising a silicone-based impact modifier different from the poly(carbonate-siloxane), a methyl methacrylate-butadiene-styrene copolymer, or a combination thereof; preferably wherein the silicone-based impact modifier comprises a silicone graft copolymer having a core comprising a polydiorganosiloxane and a vinyl-based monomer graft copolymerized with the core to form a shell, a methyl methacrylate core shell copolymer with butyl acrylate rubber and dimethylsiloxane as the core, or a combination thereof, more preferably wherein the silicone-based impact modifier comprises a silicone-acrylic rubber.

Aspect 4b. The composition of aspect 3b, wherein the one or more bisphenol A polycarbonate homopolymers is present in an amount of 70 to 92 wt % based on the total weight of the composition; the impact modifier is present in an amount of 1 to 10 wt % based on the total weight of the composition; the poly(carbonate-siloxane) has a siloxane content of 35 to 65 wt % based on the total weight of the poly(carbonate-siloxane); and the poly(carbonate-siloxane) is present in an amount of 1 to 15 wt % based on the total weight of the composition.

Aspect 5b. The composition of any one or more of aspects 1b to 4b, wherein the polycarbonate composition has improved resistance to sunscreen as compared to a reference composition having the same total siloxane content, but provided only by a reference poly(carbonate-siloxane) having a siloxane content of 20 wt % based on the total weight of the reference poly(carbonate-siloxane).

Aspect 6b. The composition of aspect 5b, wherein the poly(carbonate-siloxane) has a siloxane content of 35 to 65 wt %, based on the total weight of the poly(carbonate-siloxane); and the poly(carbonate-siloxane) is present in an amount of 1 to 20 wt %, preferably 2.5 to 15 wt %, based on the total weight of the composition.

Aspect 7b. The composition of aspect 5b or 6b, comprising, based on the total weight of the composition, 85 to 98 wt %, preferably 87 to 97 wt %, of one or more bisphenol homopolycarbonates; 2 to 15 wt %, preferably 3 to 13 wt % of the poly(carbonate-siloxane); and 0 to 10 wt %, preferably 0.05 to 1 wt % of a flame retardant, provided that the total weight of the composition does not exceed 100 wt %; wherein the composition has a notched Izod impact of greater than 500 J/m as measured according to ASTM D256-10 at −30° C. on a sample of 3.2 mm thickness; and a ductility of greater than 80% as measured according to ASTM D256-10 at −30° C. on a sample of 3.2 mm thickness.

Aspect 8b. The composition of any one or more of aspects 1b to 7b, comprising a first bisphenol A homopolycarbonate having an average molecular weight of 15,000 to 25,000 Daltons, and a second bisphenol A homopolycarbonate having an average molecular weight of 26,000 to 40,000 Daltons, each determined by gel permeation chromatography, using a crosslinked styrene-divinylbenzene column and calibrated to bisphenol A polycarbonate standards, preferably wherein the weight ratio of the first polycarbonate relative to the second bisphenol homopolycarbonate is 1:3 to 3:1.

Aspect 9b. The composition of any one or more of aspects 1b to 8b, wherein the poly(carbonate-siloxane) comprises siloxane units of formula (5) or formula (6), wherein each R is independently a $C_{1-13}$ monovalent organic group, each Ar is independently an arylene group, each $R^5$ is independently a divalent $C_{1-30}$ hydrocarbylene group, and E has an average value of 2 to 1,000, or 2 to 500, 2 to 200, or 2 to 125, 5 to 80, or 10 to 70; preferably siloxane units of formula (7) wherein each R is independently a $C_{1-3}$ alkyl, $C_{1-3}$ alkoxy, $C_{3-6}$ cycloalkyl, $C_{3-6}$ cycloalkoxy, $C_{6-14}$ aryl, $C_{6-10}$ aryloxy, $C_7$ arylalkylene, $C_7$ arylalkylenoxy, $C_7$ alkylarylene, or $C_7$ alkylarylenoxy; M is bromo or chloro, a $C_{1-3}$ alkyl, $C_1$-$C_{33}$ alkoxy, phenyl, chlorophenyl, or tolyl; $R^6$ is a dimethylene, trimethylene, or tetramethylene; n is independently 0 to 4; and E has an average value of 10 to 100; more preferably units of formula (7a), (7b), (7c), or a combination thereof, wherein E has an average value of 10 to 100; more preferably siloxane units of the formula (7a) wherein E has an average value of 20 to 80 or 30 to 70.

Aspect 10b. The composition of any one or more of aspects 1b to 9b, wherein the poly(carbonate-siloxane) comprises bisphenol A carbonate units and polydimethyl siloxane units.

Aspect 11b. The composition of any one or more of aspects 1b to 10b, further comprising a second poly(carbonate-siloxane) with a siloxane content of 5 to 25 wt % based on the total weight of the second poly(carbonate-siloxane), wherein the polycarbonate composition has a total siloxane content of 0.5 to 10 wt % based on the total weight of the composition.

Aspect 12b. The composition of any one or more of aspects 1b to 10b, wherein the composition is free of a poly(carbonate-siloxane) with a siloxane content of equal to or less than 30 wt % based on the total weight of the poly(carbonate-siloxane).

Aspect 13b. The composition of any one or more of aspects 1b to 12b, further comprising a flame retardant, wherein the flame retardant comprises an alkali metal salt of a sulfonate, an inorganic acid complex salt, phosphate, phosphazene, brominated flame retardant or a combination thereof.

Aspect 14b. The composition of aspect 13b, wherein the flame retardant is potassium diphenylsulfone sulfonate, sodium toluene sulfonate, potassium perfluorobutane sulphonate, bisphenol A bis(diphenyl phosphate), resorcinol bis(diphenyl phosphate), poly(bis(phenoxy)phosphazene, a brominated polycarbonate, or a combination thereof, preferably wherein the flame retardant comprises a brominated polycarbonate.

Aspect 15b. The composition of any one or more of aspects 1b to 14b, further comprising up to 10 wt % of titanium dioxide, carbon black, an inorganic pigment, an organic pigment, a dye, or a combination thereof, based on the total weight of the composition.

Aspect 16b. The composition of any one or more of aspects 1b to 15b, further comprising no more than 5 wt %, based on the weight of the composition, of an anti-drip agent, a processing aid, a heat stabilizer, an antioxidant, an ultra violet light absorber, or a combination thereof.

Aspect 17b. The composition of any one or more of aspects 1b to 16b, wherein the composition has one or more of the following properties: a UL-94 flammability rating of V1 or better as measured on a flame bar having a thickness of 1.5 mm; a melt flow rate higher than 5 g/10 min determined in accordance with ASTM D1238 under a load of 1.2 kg at 300° C. with a dwelling time of 300 seconds; an Izod notched impact energy of at least 550 J/m measured at −30° C. on a sample of 3.2 mm thickness according to ASTM D256-10; or a multi-axial impact of greater than 50 J measured at −30° C. and 3.3 m/s on a sample of 3.2 mm thickness according to ASTM D3763.

Aspect 18b. An article comprising the composition of any one of aspects 1b to 17b, wherein the article is a molded article, a thermoformed article, an extruded film, an extruded sheet, a honeycomb structure, one or more layers of a multi-layer article, a substrate for a coated article, and a substrate for a metallized article.

Aspect 19b. The article of aspect 18b, wherein the article is a component of a consumer electronic device, preferably a gaming console, a gaming controller, a portable gaming device, a cellular telephone, a television, a personal computer, a tablet computer, a laptop computer, a personal digital assistant, a portable media player, a digital camera, a portable music player, an appliance, a power tool, a robot, a toy, a greeting card, a home entertainment system, and active loudspeaker, or a soundbar, or the article is an electronic housing for an adapter, a cell phone, a smart phone, a GPS device, a laptop computer, a tablet computer, an e-reader, a copier, or a solar apparatus, or the article is an electrical junction box, an electrical connector, an electrical vehicle charger, an outdoor electrical enclosure, a smart meter enclosure, a smart grid power node, a photovoltaic frame, or a miniature circuit breaker, or the article is an automotive, scooter, or motorcycle exterior or interior component, preferably a panel, a quarter panel, a rocker panel, a trim, fender, a battery cover, a door, a deck-lid, a trunk lid, a hood, a bonnet, a roof, a bumper, a fascia, grille, a mirror housing, a pillar appliqué, a cladding, body side molding, a wheel cover, a hubcap, a door handle, a spoiler, a window frame, a headlamp bezel, a headlamp, a tail lamp, a tail lamp housing, a tail lamp bezel, a license plate enclosure, a roof rack, or a running board; or the article is a component of a healthcare product, or a component of a consumer electronic device.

Aspect 20b. A method of manufacture of an article, comprising molding, extruding, casting, or shaping the composition of any one of aspects 1b to 17b to form the article.

The singular forms "a," "an," and "the" include plural referents unless the context clearly dictates otherwise. "Or" means "and/or" unless clearly indicated otherwise by context. Unless defined otherwise, technical and scientific terms used herein have the same meaning as is commonly understood by one of skill in the art to which this invention belongs. A "combination" is inclusive of blends, mixtures, alloys, reaction products, and the like. A "combination thereof" is open to the presence of like components not named.

As used herein, the term "hydrocarbyl" and "hydrocarbon" refers broadly to a substituent comprising carbon and hydrogen, optionally with 1 to 3 heteroatoms, for example, oxygen, nitrogen, halogen, silicon, sulfur, or a combination thereof; "alkyl" refers to a straight or branched chain, saturated monovalent hydrocarbon group; "alkylene" refers to a straight or branched chain, saturated, divalent hydrocarbon group; "alkylidene" refers to a straight or branched chain, saturated divalent hydrocarbon group, with both valences on a single common carbon atom; "alkenyl" refers to a straight or branched chain monovalent hydrocarbon group having at least two carbons joined by a carbon-carbon double bond; "cycloalkyl" refers to a non-aromatic monovalent monocyclic or multicylic hydrocarbon group having at least three carbon atoms, "cycloalkenyl" refers to a non-aromatic cyclic divalent hydrocarbon group having at least three carbon atoms, with at least one degree of unsaturation; "aryl" refers to an aromatic monovalent group containing only carbon in the aromatic ring or rings; "arylene" refers to an aromatic divalent group containing only carbon in the aromatic ring or rings; "alkylarylene" refers to an aryl group that has been substituted with an alkyl group as defined above, with 4-methylphenylene being an exemplary alkylarylene group; "arylalkylene" refers to an alkyl group that has been substituted with an aryl group as defined above, with benzyl being an exemplary arylalkylene group; and the suffix "oxy" refers to any of the groups as defined above with the indicated number of carbon atoms attached through an oxygen bridge (—O—), with an exemplary -oxy group being an alkoxy such as methoxy.

Unless otherwise indicated, each of the foregoing groups can be unsubstituted or substituted, provided that the substitution does not significantly adversely affect synthesis, stability, or use of the compound. The term "substituted" as used herein means that at least one hydrogen on the designated atom or group is replaced with another group, provided that the designated atom's normal valence is not exceeded. When the substituent is oxo (i.e., =O), then two hydrogens on the atom are replaced. Combinations of substituents and/or variables are permissible provided that the substitutions do not significantly adversely affect synthesis or use of the compound. Exemplary groups that can be present on a "substituted" position include, but are not limited to, cyano; hydroxyl; nitro; azido; alkanoyl (such as a $C_{2-6}$ alkanoyl group such as acyl); carboxamido; $C_{1-6}$ or $C_{1-3}$ alkyl, cycloalkyl, alkenyl, and alkynyl (including groups having at least one unsaturated linkages and from 2 to 8, or 2 to 6 carbon atoms); $C_{1-6}$ or $C_{1-3}$ alkoxy; $C_{6-10}$ aryloxy such as phenoxy; $C_{1-6}$ alkylthio; $C_{1-6}$ or $C_{1-3}$ alkylsulfinyl; $C_{1-6}$ or $C_{1-3}$ alkylsulfonyl; aminodi($C_{1-6}$ or $C_{1-3}$)alkyl; $C_{6-12}$ aryl having at least one aromatic rings (e.g., phenyl, biphenyl, naphthyl, or the like, each ring either substituted or unsubstituted aromatic); $C_{7-19}$ arylalkylene having 1 to 3 separate or fused rings and from 6 to 18 ring carbon atoms; or arylalkylenoxy having 1 to 3 separate or fused rings and from 6 to 18 ring carbon atoms, with benzyloxy being an exemplary arylalkylenoxy.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

While typical embodiments have been set forth for the purpose of illustration, the foregoing descriptions should not be deemed to be a limitation on the scope herein. Accordingly, various modifications, adaptations, and alternatives can occur to one skilled in the art without departing from the spirit and scope herein.

What is claimed is:

1. A polycarbonate composition comprising:
   75 to 99 wt % of one or more bisphenol A polycarbonate homopolymers based on the total weight of the polycarbonate composition;
   a poly(carbonate-siloxane) comprising a siloxane content of 35 wt % to 65 wt % based on the total weight of the poly(carbonate-siloxane) and comprising a weight average molecular weight of 32,000 to 45,000 Da, measured by gel permeation chromatography using a crosslinked styrene-divinyl benzene column, at a sample concentration of 1 milligram per milliliter, and as calibrated with bisphenol A polycarbonate standards, wherein the polycarbonate composition comprises 4 to 10 wt % siloxane content; and
   wherein a sample of the composition has improved chemical resistance as compared to a reference composition,
   wherein a molded sample of the polycarbonate composition has
   a tensile strength retention of 80% and higher after exposure of the bar for 168 hours to SANI-CLOTH AF3 at a temperature of 23° C. under 0.5% or 1% strain compared to a non-exposed molded sample of a reference composition tested at the same temperature, and
   a tensile elongation retention of 65% and higher after exposure of the bar for 168 hours to SANI-CLOTH AF3 at a temperature of 23° C. under 0.5% or 1% strain compared to a non-exposed molded sample of a reference composition tested at the same temperature,
   wherein the reference composition is the same as the polycarbonate composition, except that the reference composition comprises a reference poly(carbonate-siloxane) comprising a siloxane content of 20 wt %, based on the total weight of the reference poly(carbonate-siloxane).

2. The polycarbonate composition of claim 1, wherein the poly(carbonate-siloxane) comprises a weight average molecular weight of 35,000 to 45,000 Da, measured by gel permeation chromatography using a crosslinked styrene-divinyl benzene column, at a sample concentration.

3. The composition of claim 1, wherein
   the poly(carbonate-siloxane) has a siloxane content of 35 wt % and up to 60 wt % based on the total weight of the poly(carbonate-siloxane); and the poly(carbonate-siloxane) is present in an amount of 5 to 15 wt %, based on the total weight of the composition.

4. The composition of claim 1, comprising a first bisphenol A homopolycarbonate comprising an average molecular weight of 15,000 to 25,000 Daltons, and a second bisphenol A homopolycarbonate comprising an average molecular weight of 26,000 to 40,000 Daltons, each determined by gel permeation chromatography, using a crosslinked styrene-divinylbenzene column and calibrated to bisphenol A polycarbonate standards, wherein the weight ratio of the first bisphenol A polycarbonate homopolymer relative to the second bisphenol A polycarbonate homopolymer is 5:1 to 1:5.

5. The composition of claim 1, wherein the poly(carbonate-siloxane) comprises siloxane units of the formula

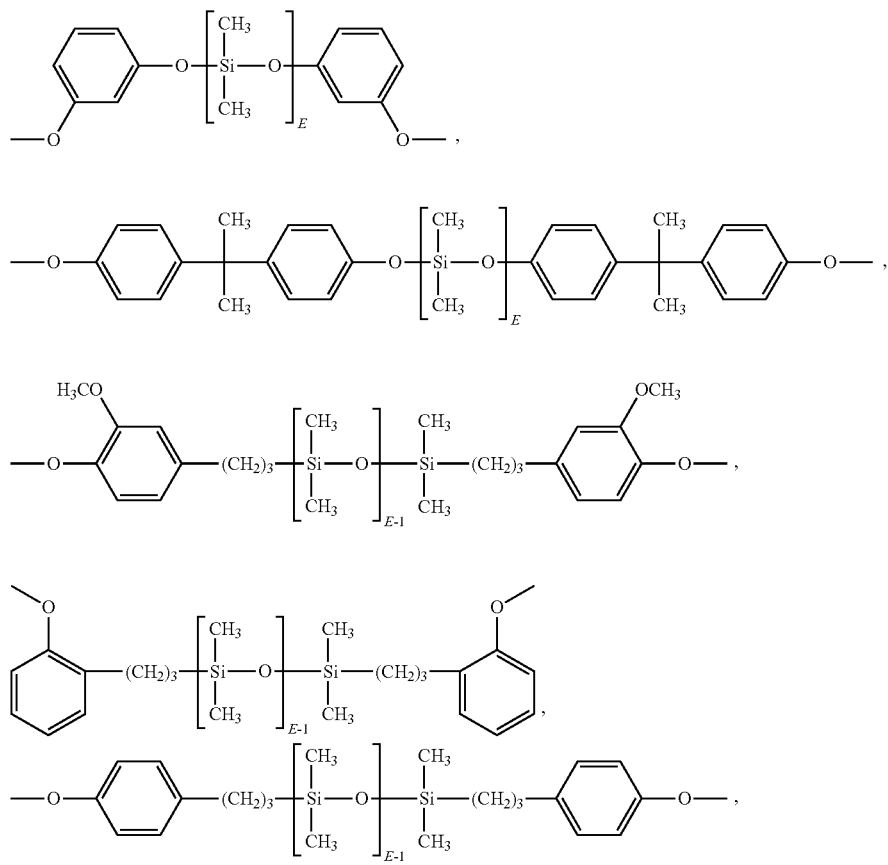

or a combination thereof, wherein E has an average value of 10 to 100.

6. The composition of claim 1, further comprising a second poly(carbonate-siloxane) with a siloxane content of 5 to 25 wt % based on the total weight of the second poly(carbonate-siloxane), wherein the polycarbonate composition has a total siloxane content of 4 to 10 wt % based on the total weight of the composition.

7. The composition of claim 1, further comprising a flame retardant, wherein the flame retardant comprises an alkali metal salt of a sulfonate, an inorganic acid complex salt, phosphate, phosphazene, brominated flame retardant or a combination thereof.

8. The composition of claim 7, wherein the flame retardant is potassium diphenylsulfone sulfonate, sodium toluene sulfonate, potassium perfluorobutane sulphonate, bisphenol A bis(diphenyl phosphate), resorcinol bis(diphenyl phosphate), poly(bis (phenoxy)phosphazene, a brominated polycarbonate, or a combination thereof.

9. The composition of claim 1, further comprising up to 10 wt % of titanium dioxide, carbon black, an inorganic pigment, an organic pigment, a dye, or a combination thereof, based on the total weight of the composition.

10. The composition of claim 1, further comprising no more than 5 wt %, based on the weight of the composition, of an anti-drip agent, a processing aid, a heat stabilizer, an antioxidant, an ultra violet light absorber, or a combination thereof.

11. The composition of claim 1, wherein the composition has one or more of the following properties:
a UL-94 flammability rating of V1 or better as measured on a flame bar having a thickness of 1.5 mm;
a melt flow rate higher than 5 g/10 min determined in accordance with ASTM D1238 under a load of 1.2 kg at 300° C. with a dwelling time of 300 seconds;
an Izod notched impact energy of at least 550 J/m measured at −30° C. on a sample of 3.2 mm thickness according to ASTM D256-10; or
a multi-axial impact of greater than 50 J measured at −30° C. and 3.3 m/s on a sample of 3.2 mm thickness according to ASTM D3763.

12. An article comprising the composition of claim 1, wherein the article is a molded article, a thermoformed article, an extruded film, an extruded sheet, a honeycomb structure, one or more layers of a multi-layer article, a substrate for a coated article, or a substrate for a metallized article.

13. The article of claim 12, wherein:
the article is a component of a consumer electronic device,
or the article is an electronic housing for an adapter, a cell phone, a smart phone, a GPS device, a laptop computer, a tablet computer, an e-reader, a copier, or a solar apparatus,
or the article is an electrical junction box, an electrical connector, an electrical vehicle charger, an outdoor electrical enclosure, a smart meter enclosure, a smart grid power node, a photovoltaic frame, or a miniature circuit breaker,
or the article is an automotive, scooter, or motorcycle exterior or interior component, preferably a panel, a quarter panel, a rocker panel, a trim, fender, a battery cover, a door, a deck-lid, a trunk lid, a hood, a bonnet, a roof, a bumper, a fascia, grille, a mirror housing, a pillar appliqué, a cladding, body side molding, a wheel cover, a hubcap, a door handle, a spoiler, a window frame, a headlamp bezel, a headlamp, a tail lamp, a tail lamp housing, a tail lamp bezel, a license plate enclosure, or a running board,
or the article is a component of a healthcare product.

14. A method of manufacture of an article, comprising molding, extruding, casting, or shaping the composition of claim 1 to form the article.

15. A polycarbonate composition comprising:
75 to 99 wt % of one or more bisphenol A polycarbonate homopolymers based on the total weight of the polycarbonate composition;
a poly(carbonate-siloxane) comprising a siloxane content of 35 wt % to 65 wt %, based on the total weight of the poly(carbonate-siloxane) and comprising a weight average molecular weight of 32,000 Da to 40,000 Da, measured by gel permeation chromatography using a crosslinked styrene-divinyl benzene column, at a sample concentration of 1 milligram per milliliter, and as calibrated with bisphenol A polycarbonate standards, wherein the poly(carbonate-siloxane) comprising a siloxane content of 35 wt % to 65 wt % is present in an amount effective to provide a total siloxane content of 4 to 10 wt % based on the total weight of the polycarbonate composition,
wherein a molded sample of the polycarbonate composition has improved resistance to sunscreen as compared to a reference composition comprising 75 to 99 wt % of one or more bisphenol A polycarbonate homopolymers and a poly(carbonate-siloxane) comprising a siloxane content of 20 wt % based on the total weight of the reference poly(carbonate-siloxane), wherein the reference composition has the same total siloxane content as the polycarbonate composition comprising 75 to 99 wt % of one or more bisphenol A polycarbonate homopolymers and a poly(carbonate-siloxane) comprising a siloxane content of 35 wt % to 65 wt %.

16. The composition of claim 15, comprising, based on the total weight of the composition,
85 to 98 wt % of one or more bisphenol homopolycarbonates;
2 to 15 wt % of the poly(carbonate-siloxane); and
0 to 10 wt % of a flame retardant, provided that the total weight of the composition does not exceed 100 wt %;
wherein the composition has
a notched Izod impact of greater than 500 J/m as measured according to ASTM D256-10 at −30° C. on a sample of 3.2 mm thickness; and
a ductility of greater than 80% as measured according to ASTM D256-10 at −30° C. on a sample of 3.2 mm thickness.

* * * * *